United States Patent
Hong et al.

(10) Patent No.: US 10,888,811 B2
(45) Date of Patent: Jan. 12, 2021

(54) AIR PURIFYING UNIT AND AIR CLEANING/VENTILATION DEVICE COMPRISING SAME

(71) Applicant: COWAY CO., LTD., Chungcheongnam-do (KR)

(72) Inventors: Hyun-Jin Hong, Seoul (KR); Chan-Jung Park, Seoul (KR); Hyung-Tae Kim, Seoul (KR); Jong-Min Kim, Seoul (KR); Young-Kwang Choi, Seoul (KR); Kyung-Hwan Lee, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 273 days.

(21) Appl. No.: 16/067,853

(22) PCT Filed: Jan. 4, 2017

(86) PCT No.: PCT/KR2017/000110
§ 371 (c)(1),
(2) Date: Jul. 3, 2018

(87) PCT Pub. No.: WO2017/119721
PCT Pub. Date: Jul. 13, 2017

(65) Prior Publication Data
US 2019/0001249 A1    Jan. 3, 2019

(30) Foreign Application Priority Data

Jan. 5, 2016  (KR) .................. 10-2016-0000940
Jan. 5, 2016  (KR) .................. 10-2016-0000992
(Continued)

(51) Int. Cl.
*B01D 46/18*    (2006.01)
*B01D 46/48*    (2006.01)
(Continued)

(52) U.S. Cl.
CPC ....... *B01D 46/0047* (2013.01); *B01D 46/002* (2013.01); *B01D 46/0026* (2013.01);
(Continued)

(58) Field of Classification Search
CPC .. B01D 46/0047; B01D 46/18; B01D 46/002; B01D 46/0026; B01D 46/0065;
(Continued)

(56) References Cited

U.S. PATENT DOCUMENTS 8,948,295 B1 *  2/2015  Nishikawa ............... H04L 69/22
                                                              375/295
9,873,127 B2 *  1/2018  Kim ........................ B03C 3/32
(Continued)

FOREIGN PATENT DOCUMENTS

JP    H10253108    9/1998
JP    2004211914   7/2004
(Continued)

OTHER PUBLICATIONS

International Search Report for PCT/KR2017/000110 dated Apr. 12, 2017, 4 pages.

*Primary Examiner* — Minh Chau T Pham
(74) *Attorney, Agent, or Firm* — Dority & Manning, P.A.

(57) ABSTRACT

An air purifying unit in which leakage of air flowing between a filter and a blowing fan is significantly reduced, and an air cleaning/ventilation device including the same, are provided. In addition, there are an air cleaning/ventilation device detachably installed in a window, used as a ventilation device, and used as an indoor air cleaning device.

18 Claims, 27 Drawing Sheets

(30) Foreign Application Priority Data

| | | |
|---|---|---|
| Jan. 5, 2016 | (KR) | 10-2016-0000995 |
| Jan. 28, 2016 | (KR) | 10-2016-0010877 |
| Jan. 28, 2016 | (KR) | 10-2016-0010881 |

(51) Int. Cl.

| | |
|---|---|
| *F24F 3/16* | (2006.01) |
| *F24F 13/08* | (2006.01) |
| *F24F 13/20* | (2006.01) |
| *F24F 13/28* | (2006.01) |
| *F24F 13/06* | (2006.01) |
| *F24F 7/007* | (2006.01) |
| *E06B 7/03* | (2006.01) |
| *B01D 46/00* | (2006.01) |
| *E06B 7/02* | (2006.01) |

(52) U.S. Cl.
CPC ......... *B01D 46/0065* (2013.01); *B01D 46/18* (2013.01); *B01D 46/48* (2013.01); *E06B 7/03* (2013.01); *F24F 3/16* (2013.01); *F24F 3/1603* (2013.01); *F24F 7/007* (2013.01); *F24F 13/06* (2013.01); *F24F 13/08* (2013.01); *F24F 13/20* (2013.01); *F24F 13/28* (2013.01); *B01D 2279/50* (2013.01); *E06B 2007/023* (2013.01); *F24F 2221/125* (2013.01)

(58) Field of Classification Search
CPC ....... B01D 46/48; B01D 2279/50; F24F 3/16; F24F 13/08; F24F 3/1603; F24F 13/20; F24F 13/28; F24F 13/06; F24F 7/007; E06B 7/03; E06B 2007/023

USPC .......... 55/289, 296, 493, 473, 385.2; 95/26, 95/273; 96/423
See application file for complete search history.

(56) References Cited

U.S. PATENT DOCUMENTS

| | | | | |
|---|---|---|---|---|
| 10,323,855 | B2* | 6/2019 | Jung | F24F 11/89 |
| 2001/0022068 | A1* | 9/2001 | Frerich | F01P 11/12 |
| | | | | 55/289 |
| 2010/0043362 | A1* | 2/2010 | Okada | F24F 3/1603 |
| | | | | 55/296 |
| 2010/0077926 | A1* | 4/2010 | Yamagishi | B03C 3/28 |
| | | | | 96/423 |
| 2010/0107575 | A1* | 5/2010 | Zhang | F24F 3/1603 |
| | | | | 55/289 |
| 2010/0126126 | A1* | 5/2010 | Cheng | B01D 46/2411 |
| | | | | 55/493 |
| 2014/0216251 | A1* | 8/2014 | Jun | B01D 46/0076 |
| | | | | 95/26 |

FOREIGN PATENT DOCUMENTS

| | | |
|---|---|---|
| JP | 2006159103 | 6/2006 |
| JP | 2006336957 | 12/2006 |
| JP | 2010196941 | 9/2010 |
| KR | 20050078248 | 8/2005 |
| KR | 20050096514 | 10/2005 |
| KR | 0625302 | 9/2006 |
| KR | 0715337 | 4/2007 |
| KR | 20110035636 | 4/2011 |
| KR | 20120029490 | 3/2012 |
| KR | 20140110454 | 9/2014 |

* cited by examiner

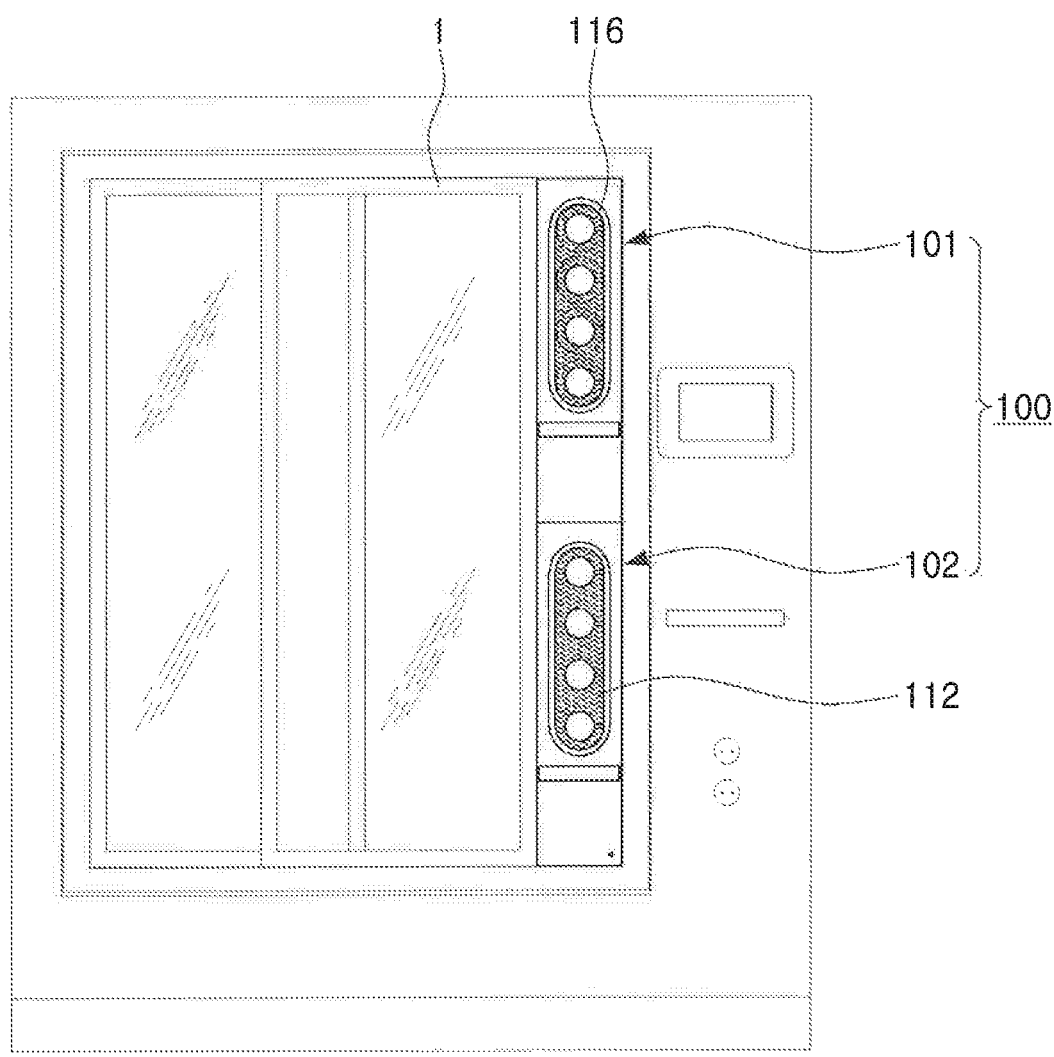

[FIG.2]
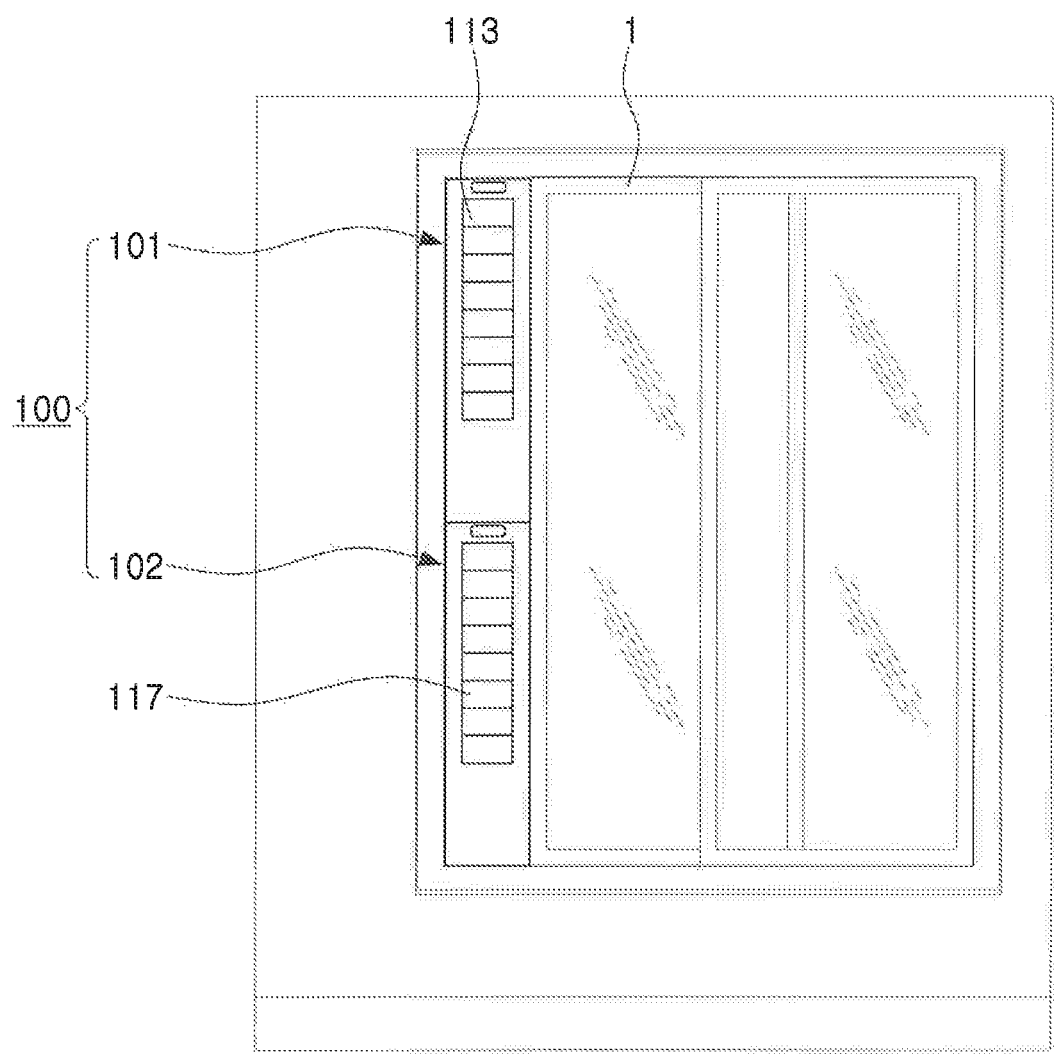

[FIG.3]
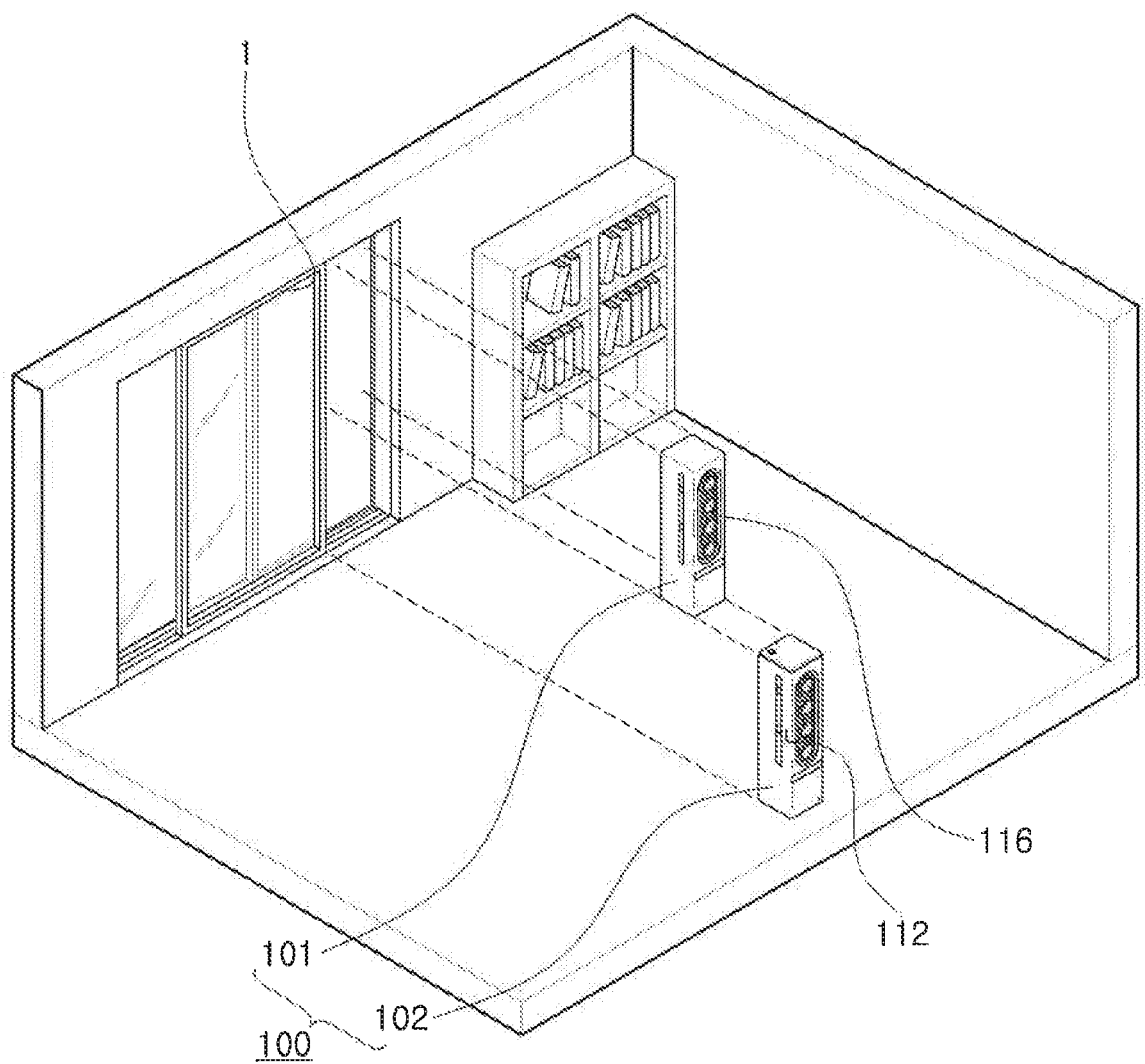

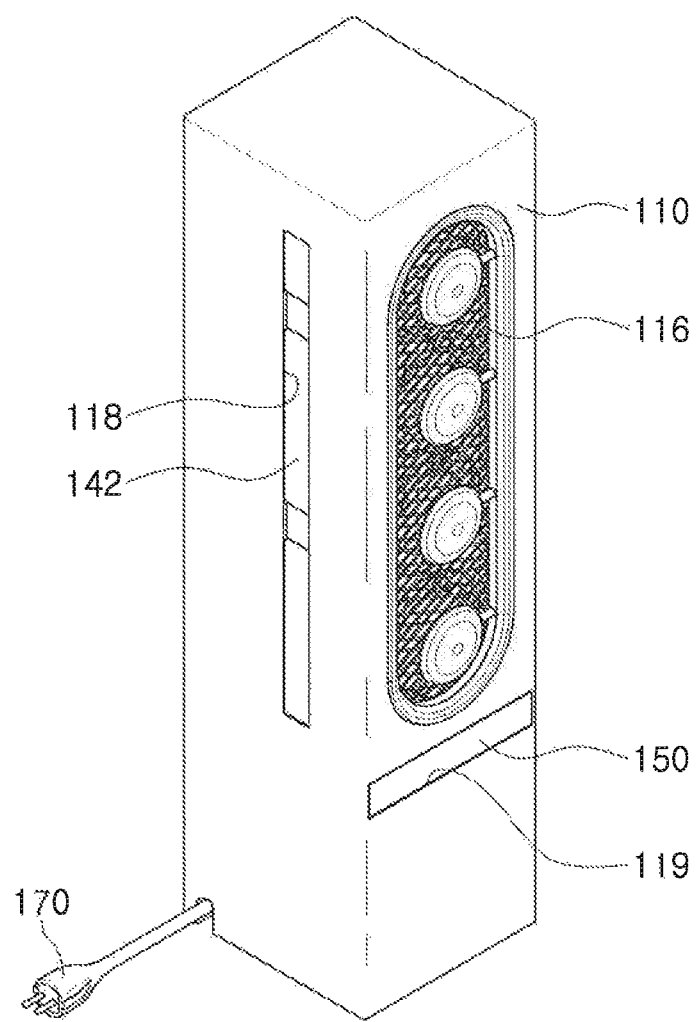
[FIG.4]

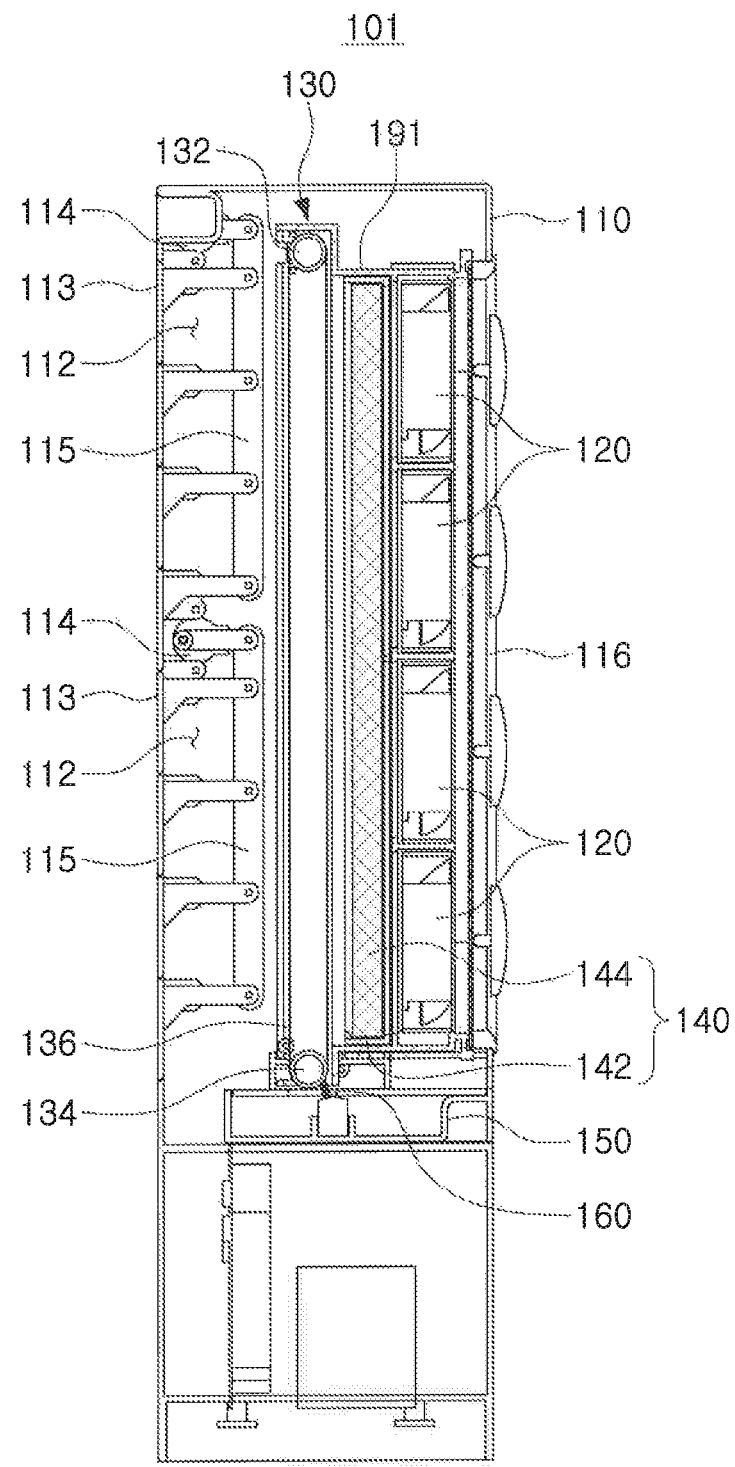
[FIG.5]

[FIG.6]
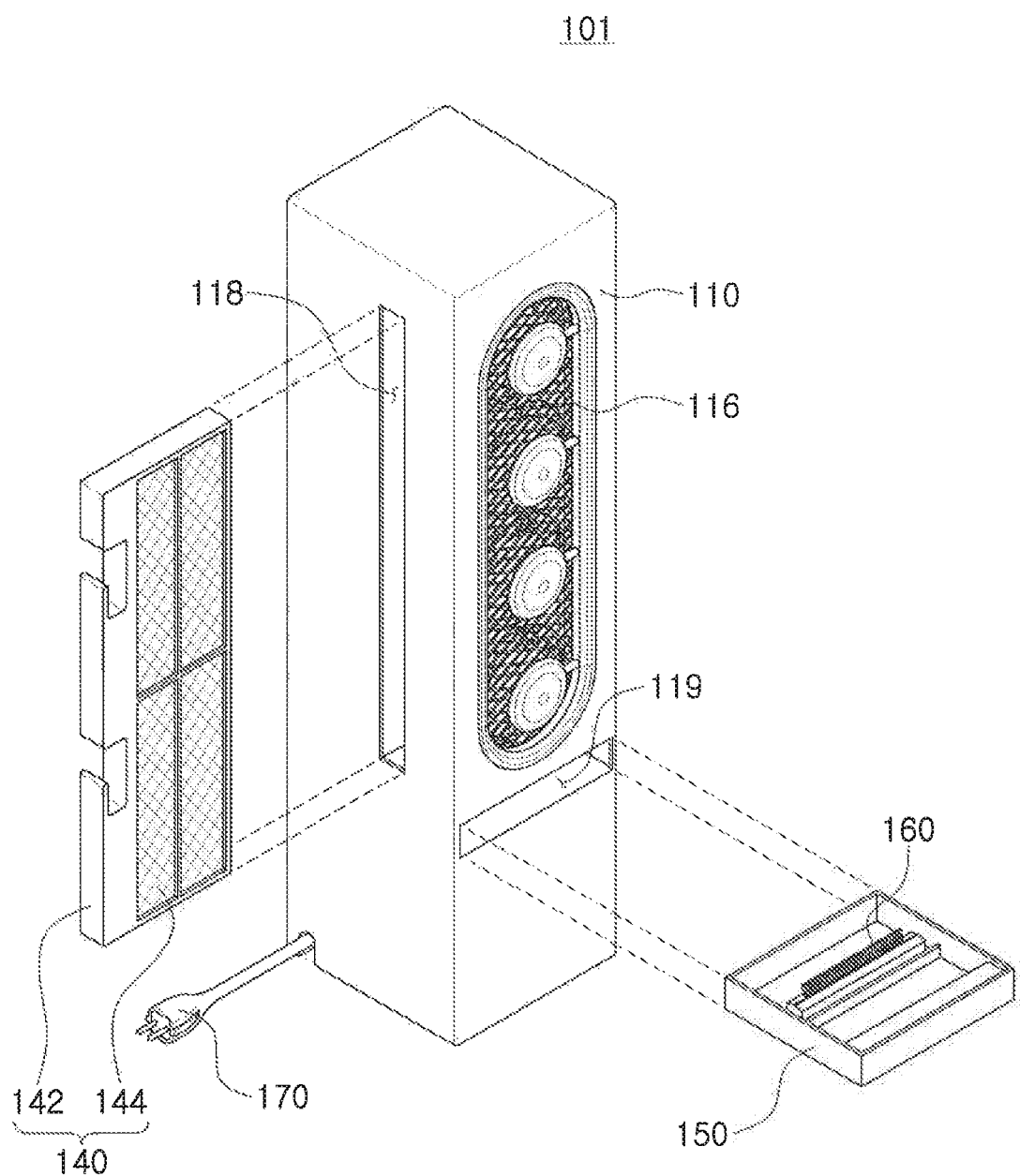

[FIG.7]
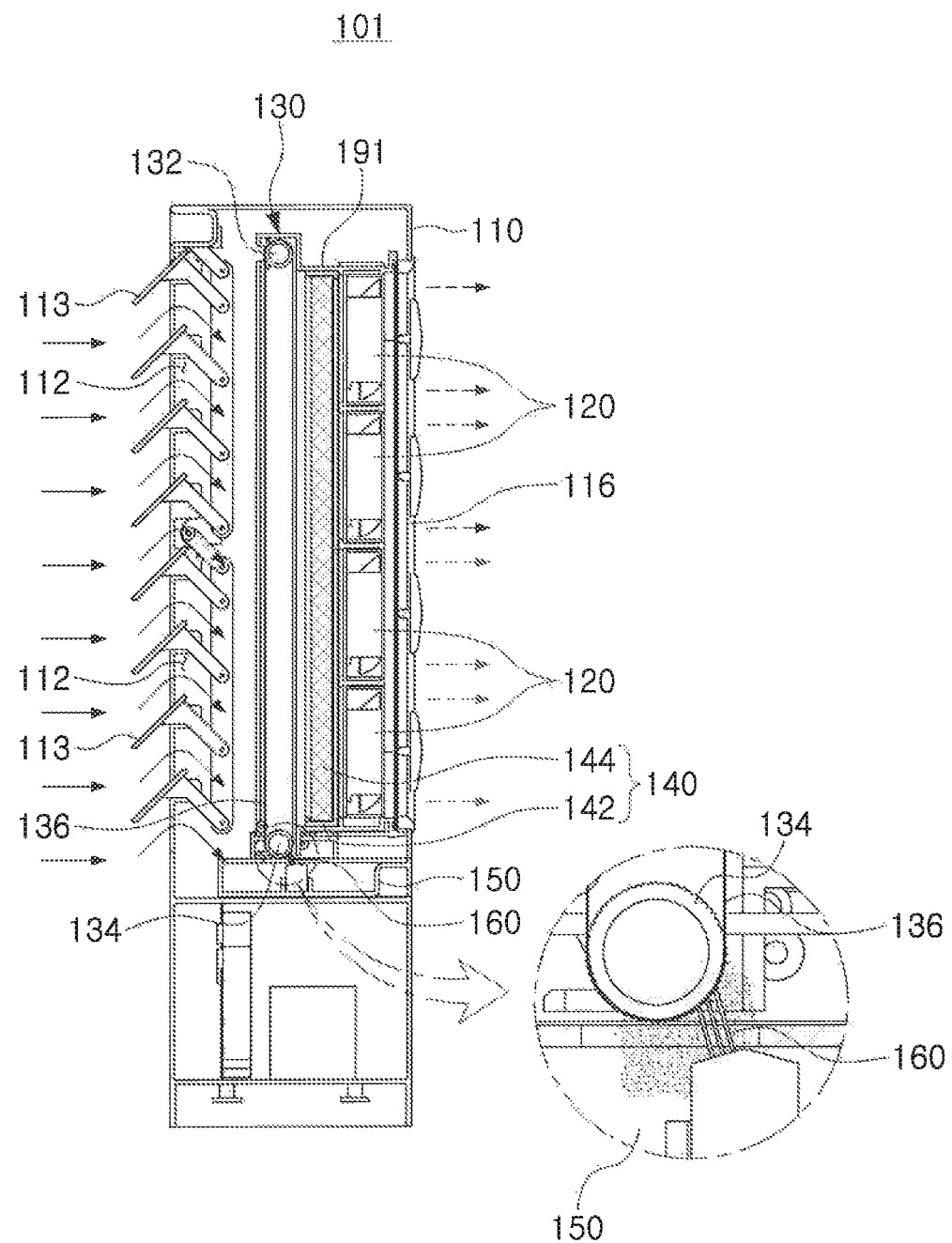

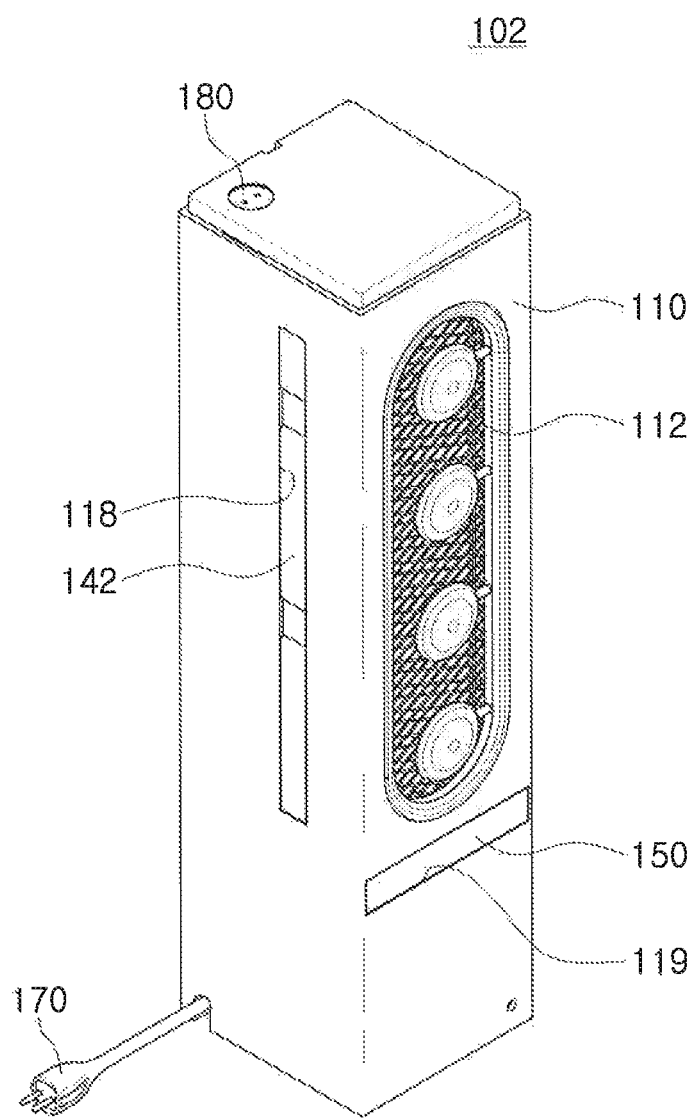

[FIG.9]
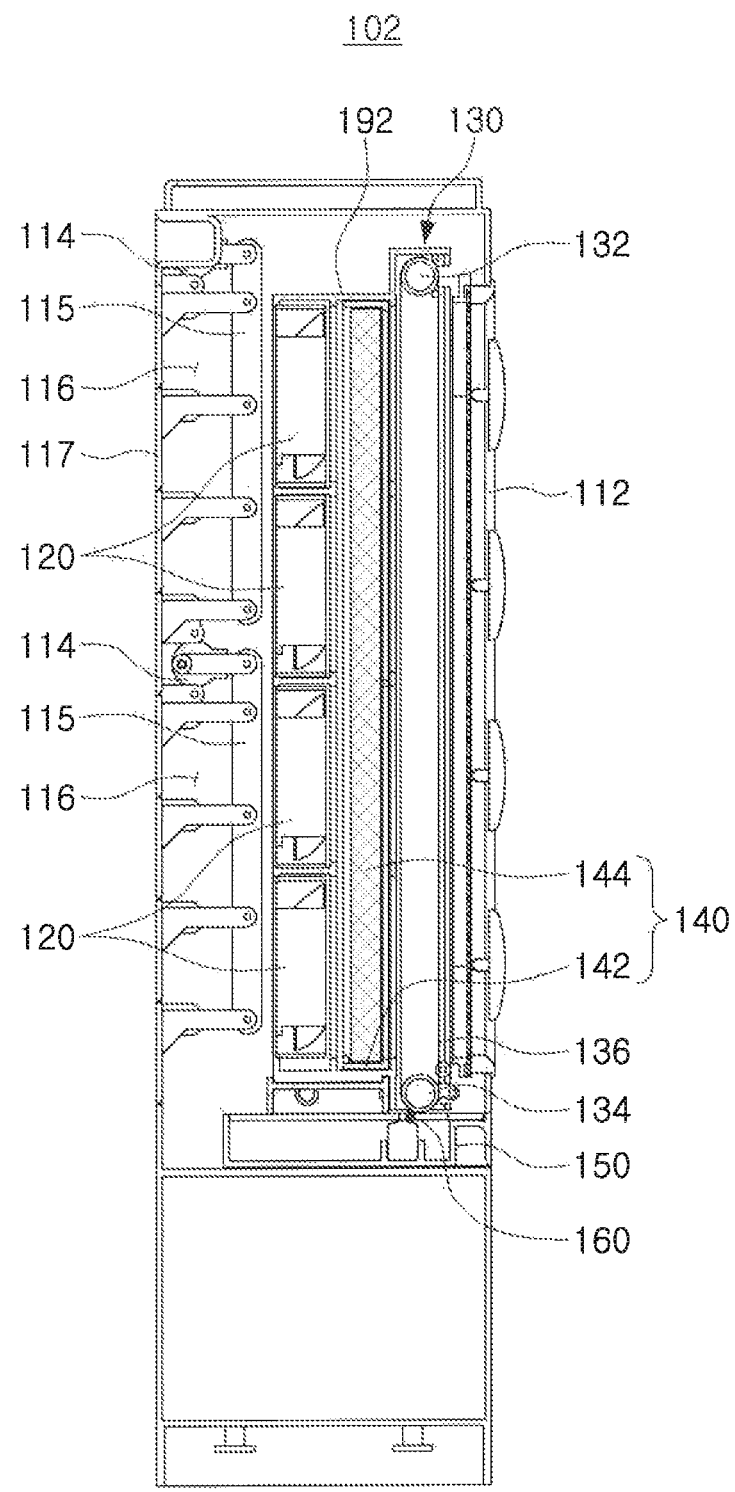

[FIG.10]
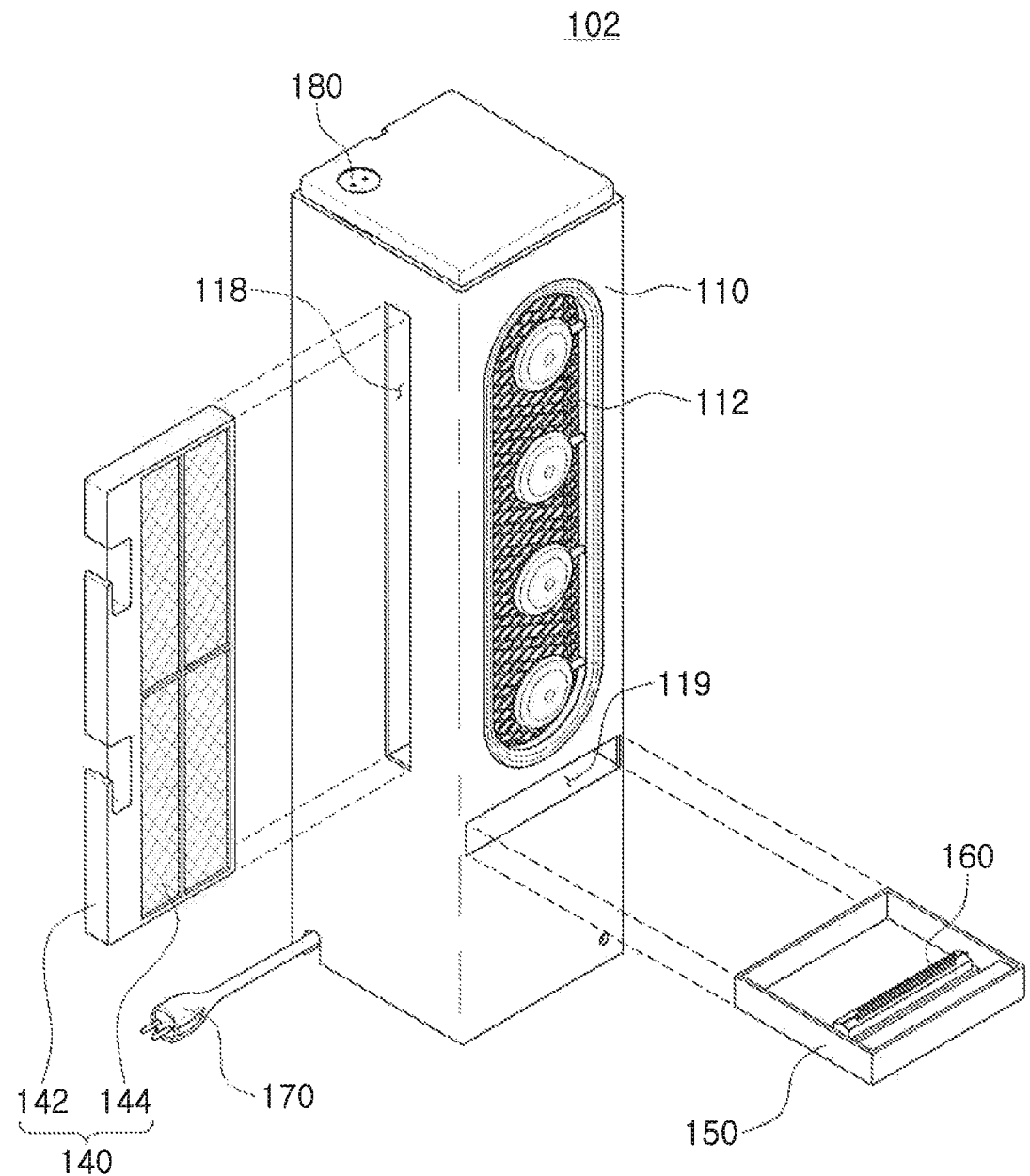

[FIG.11]
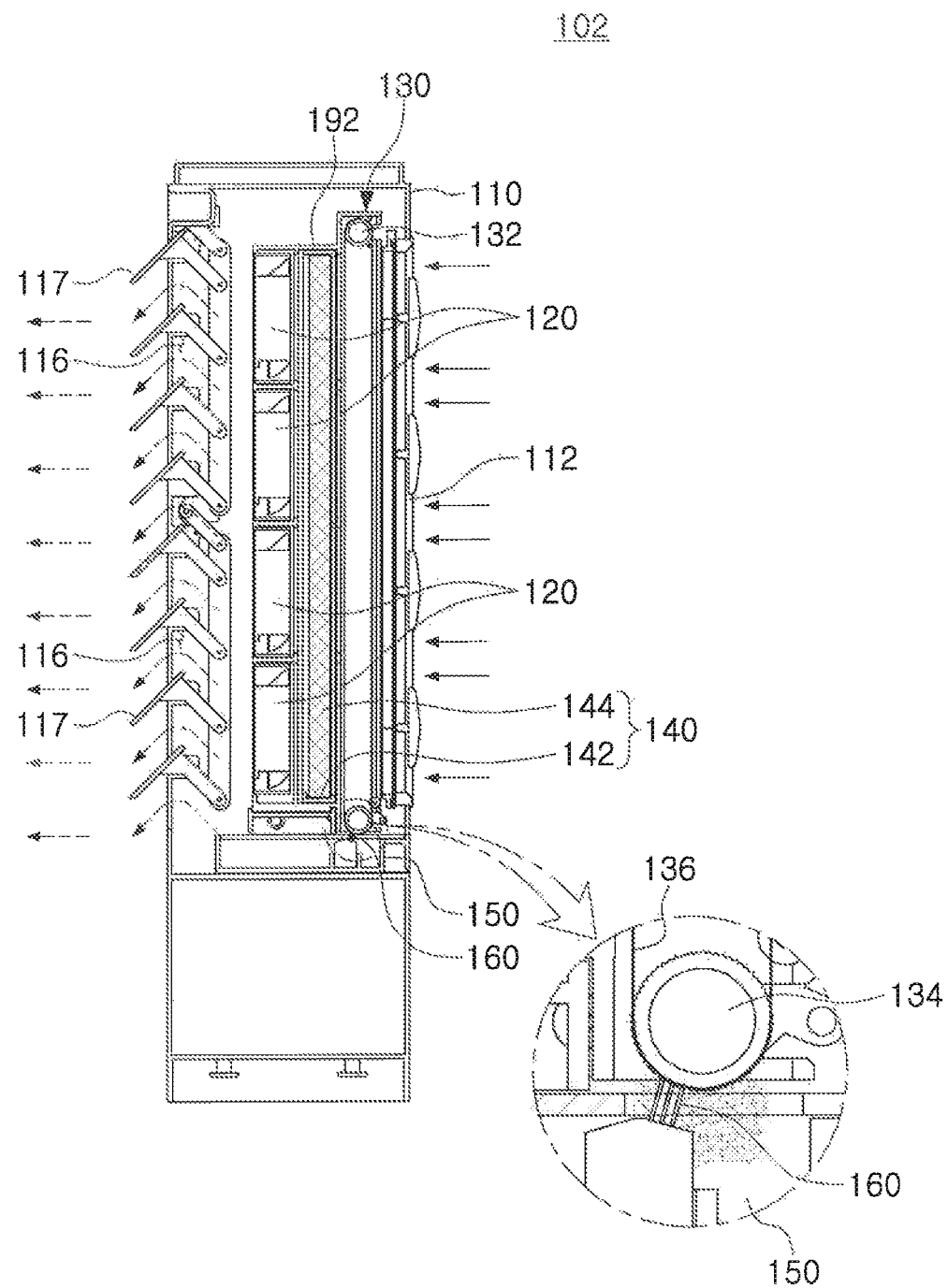

[FIG. 12]
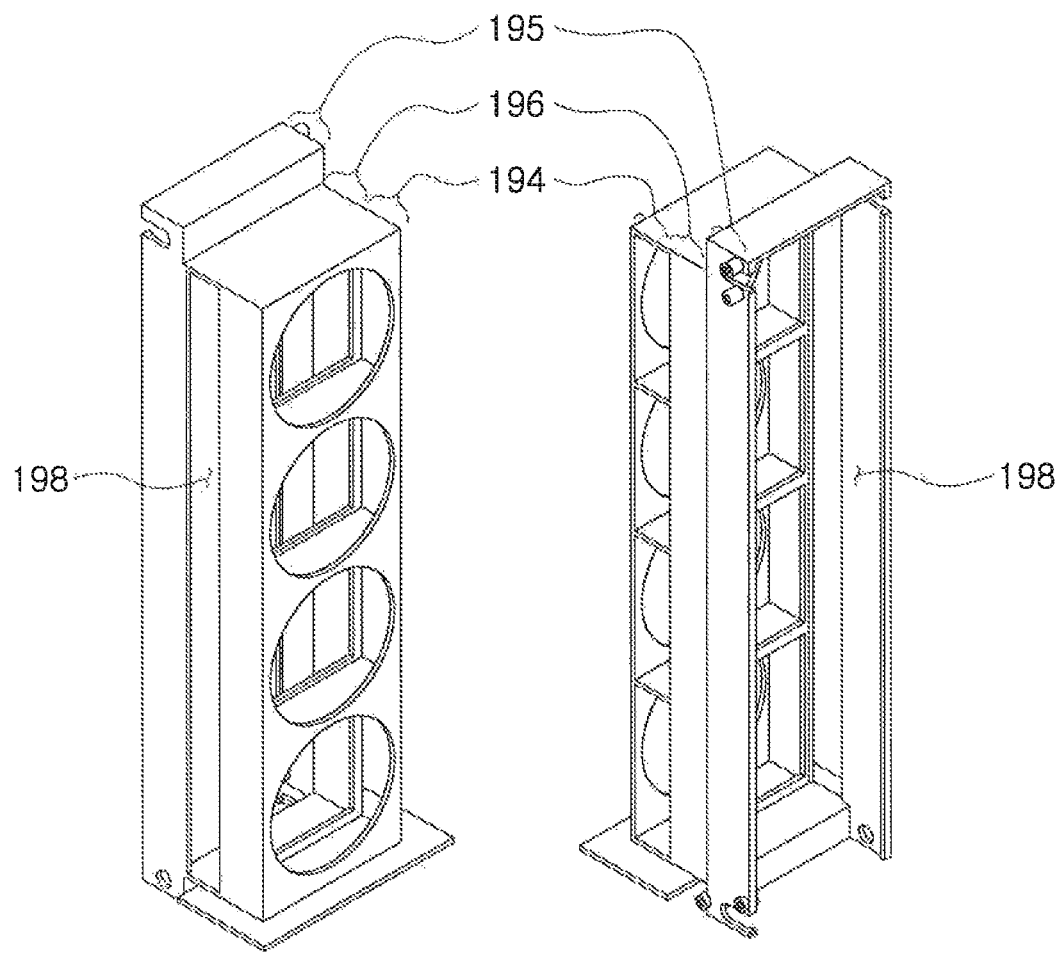

[FIG. 13]
192
(a) 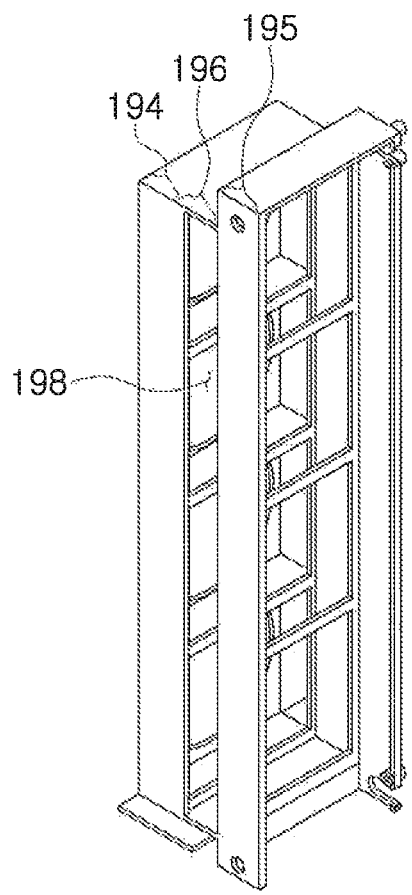
(b) 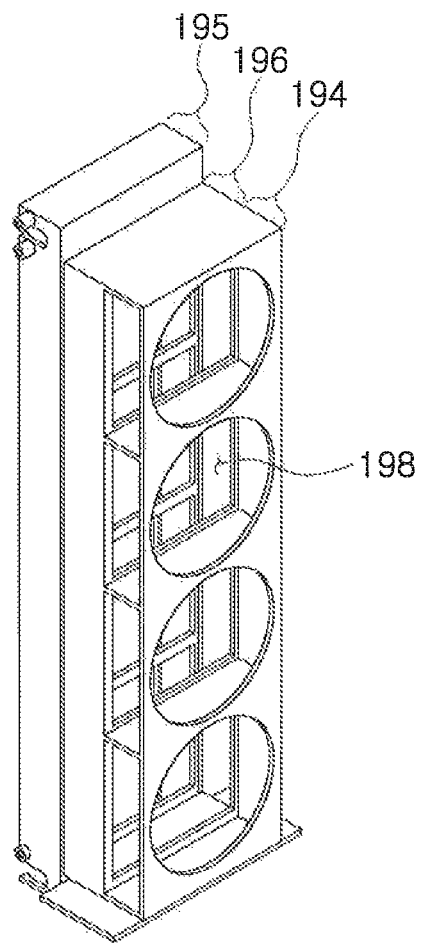

[FIG.14]
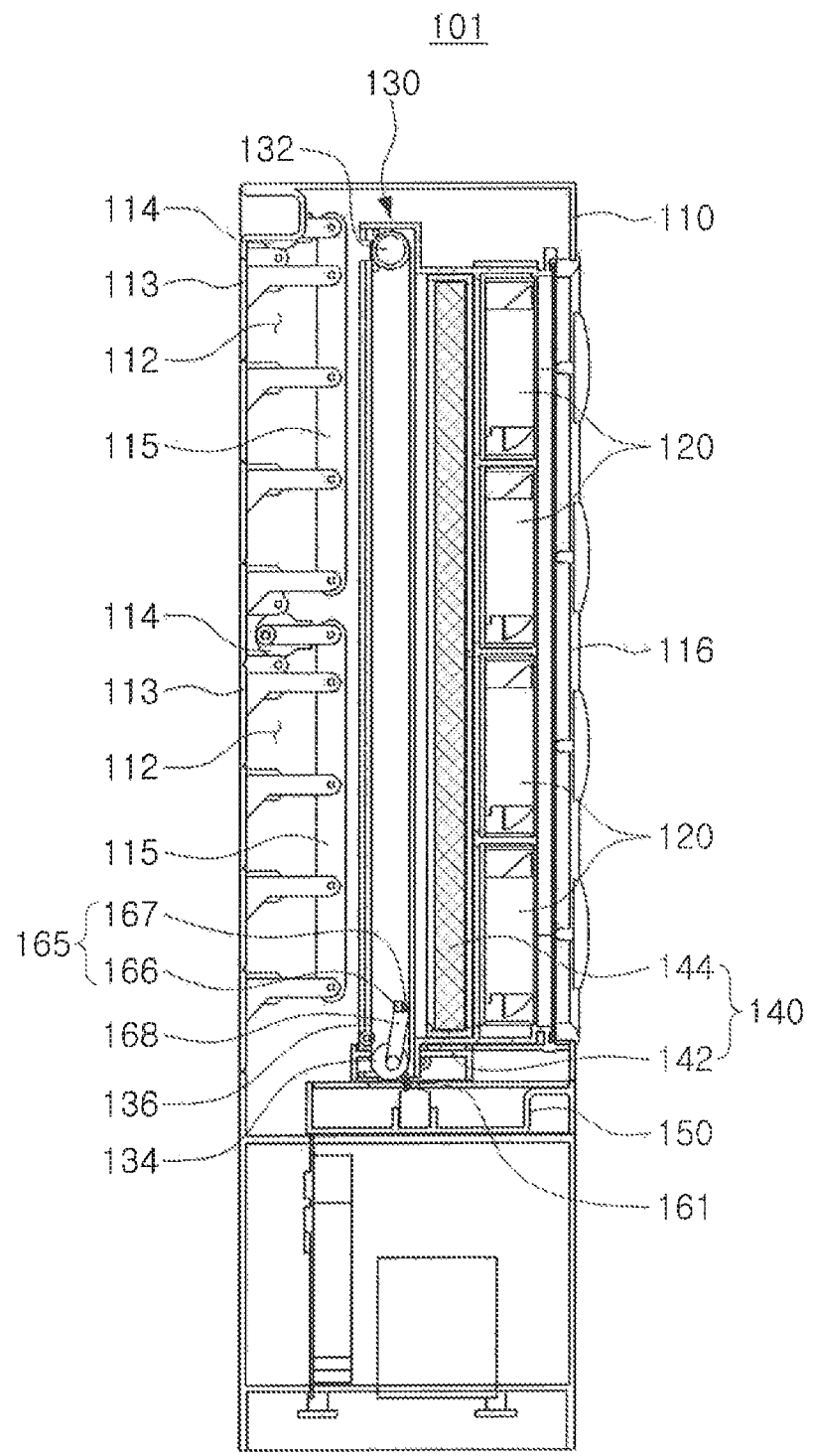

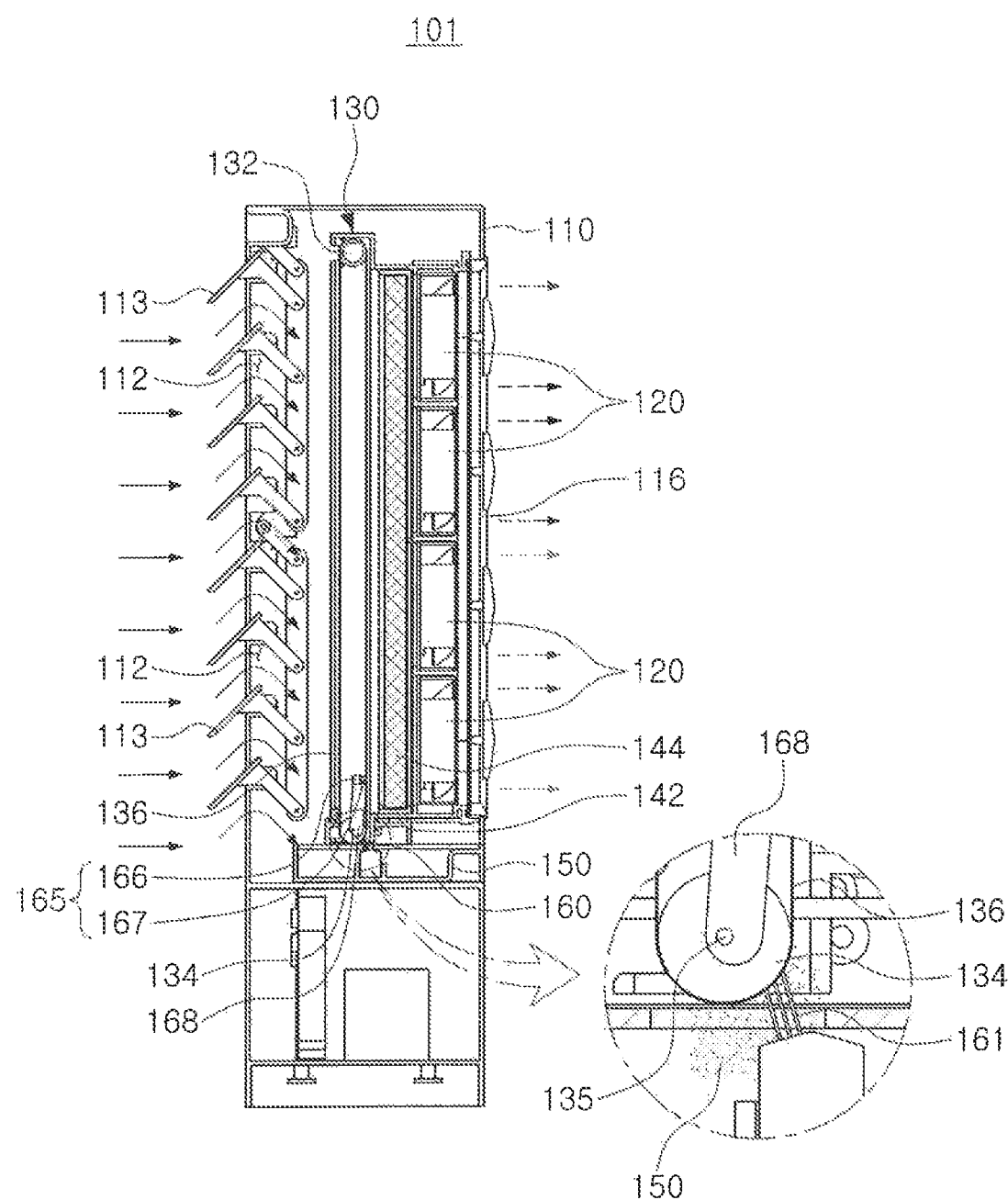
[FIG.15]

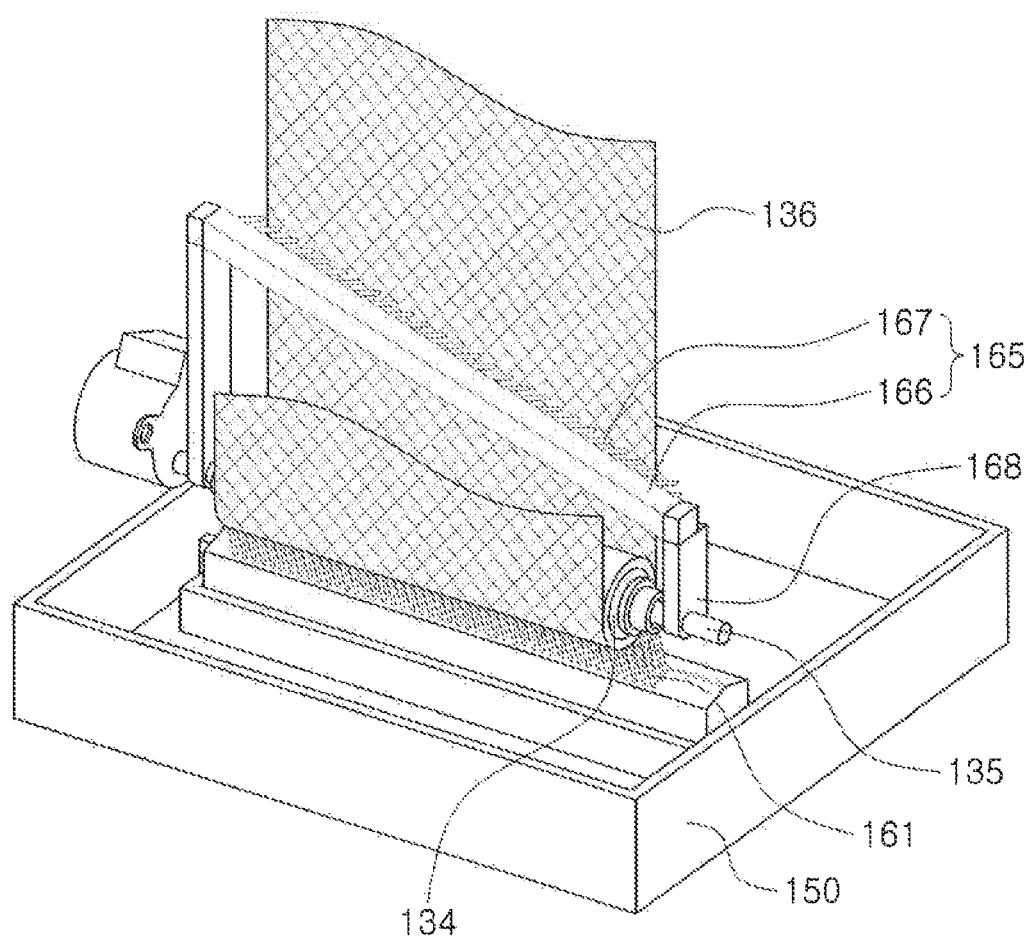
[FIG.16]

[FIG.17]
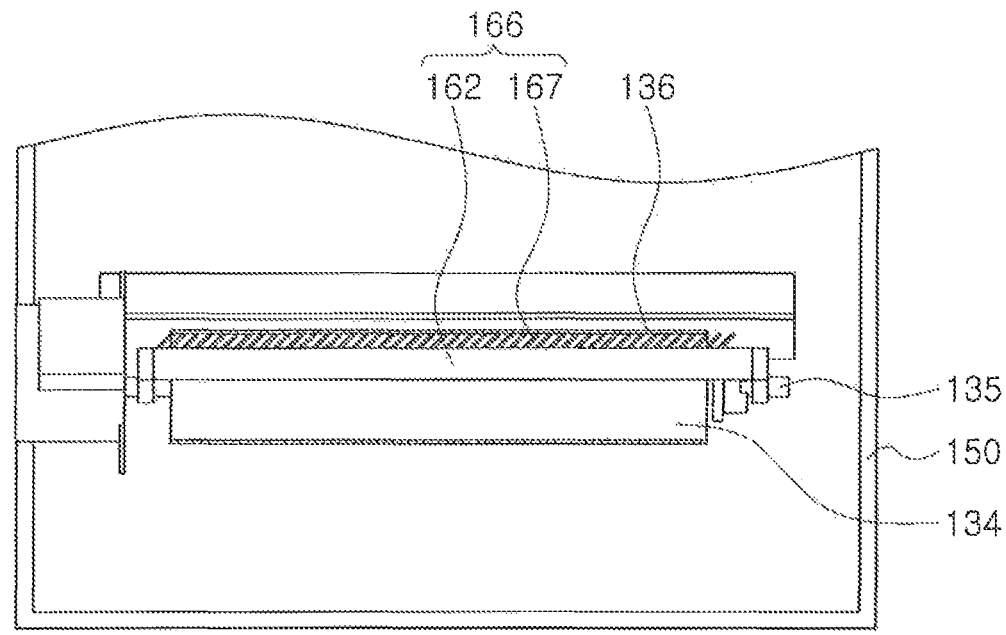
[FIG.18]
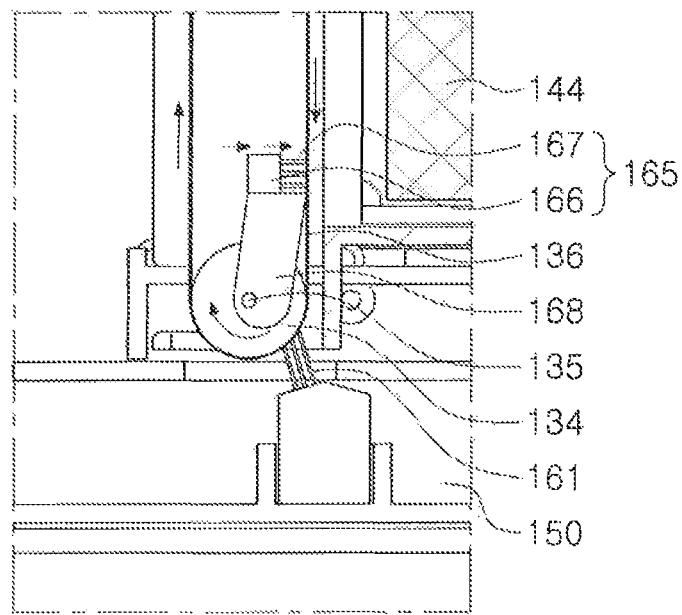

[FIG.19]
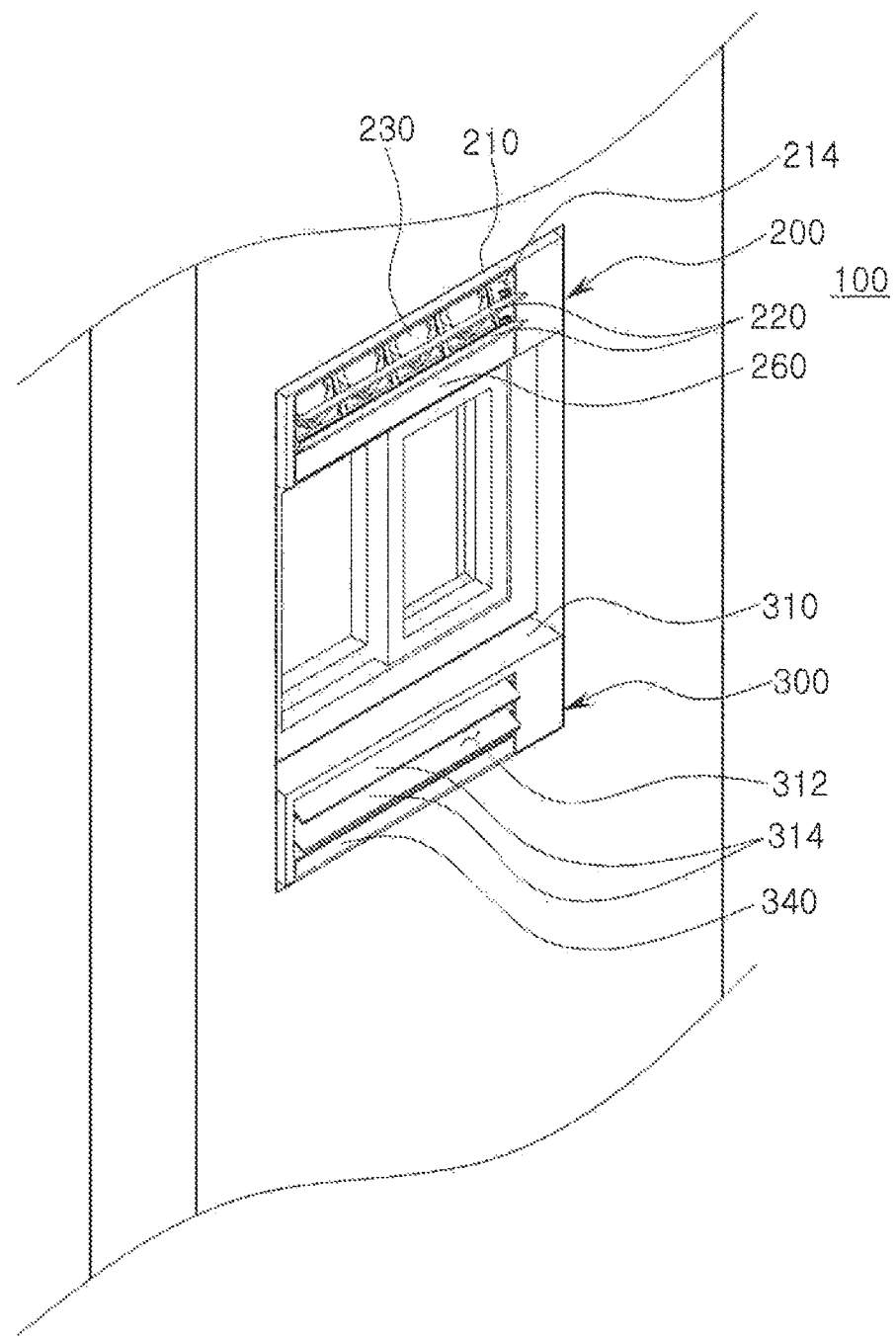

[FIG.20]
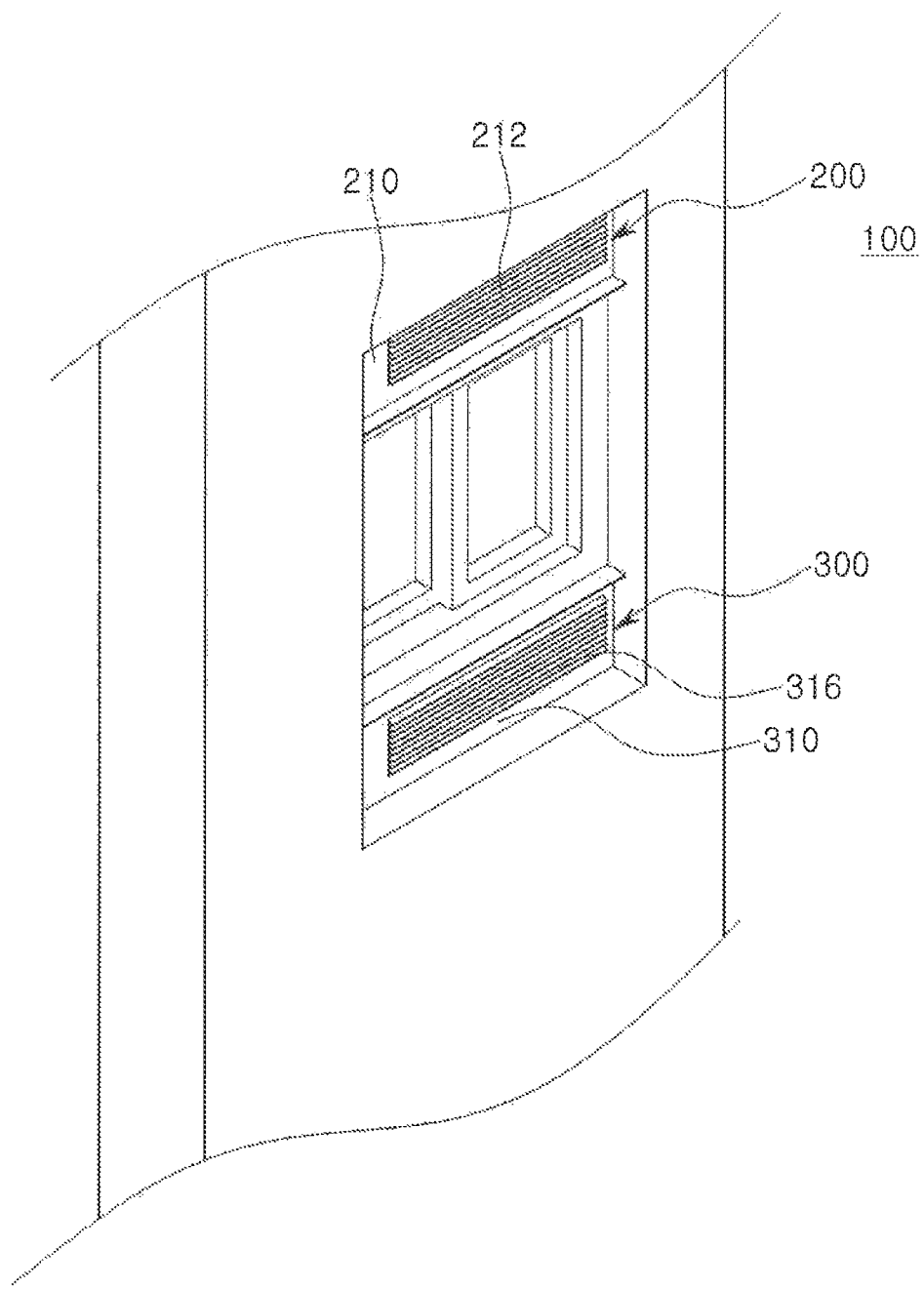

[FIG.21]
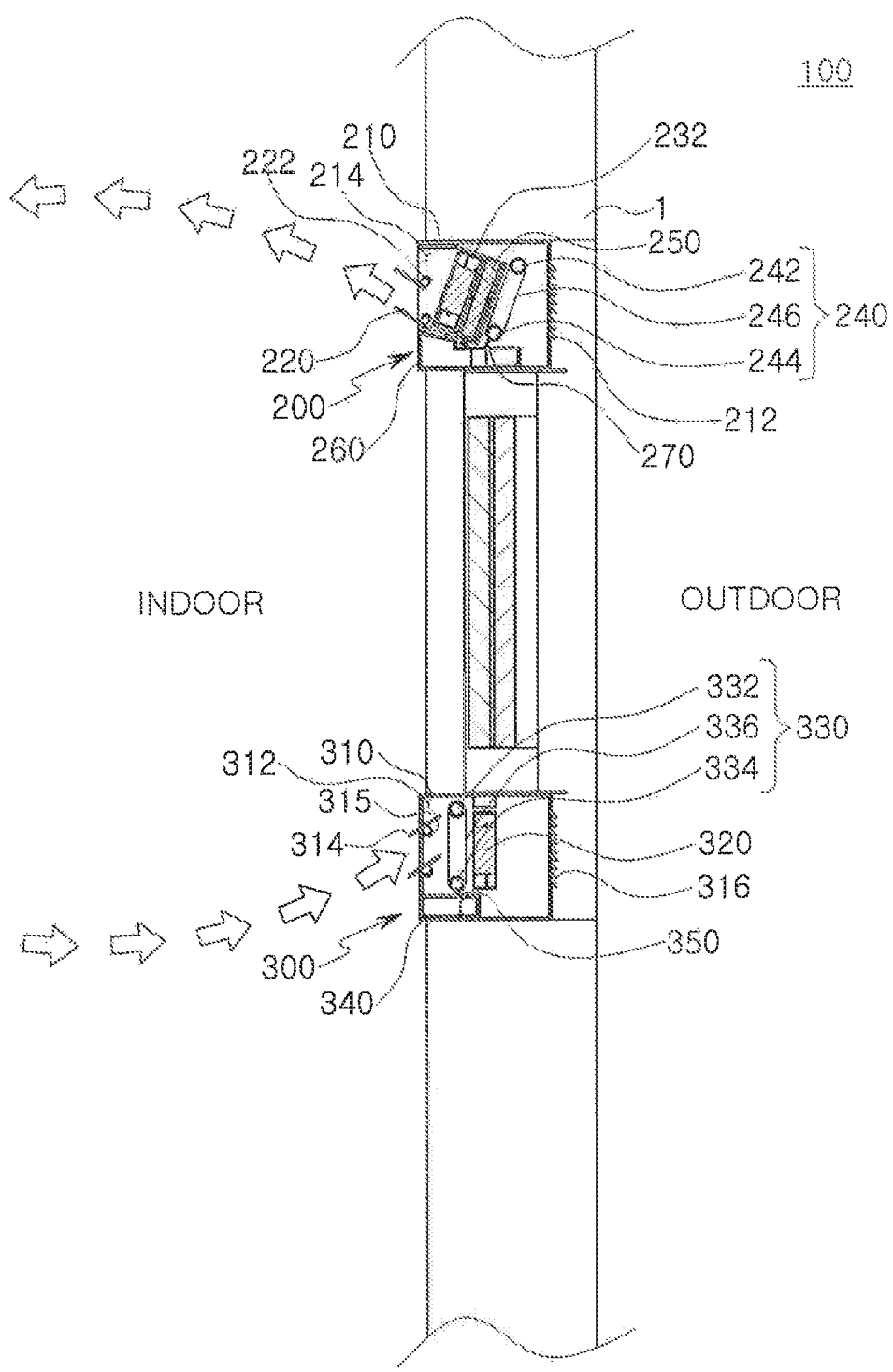

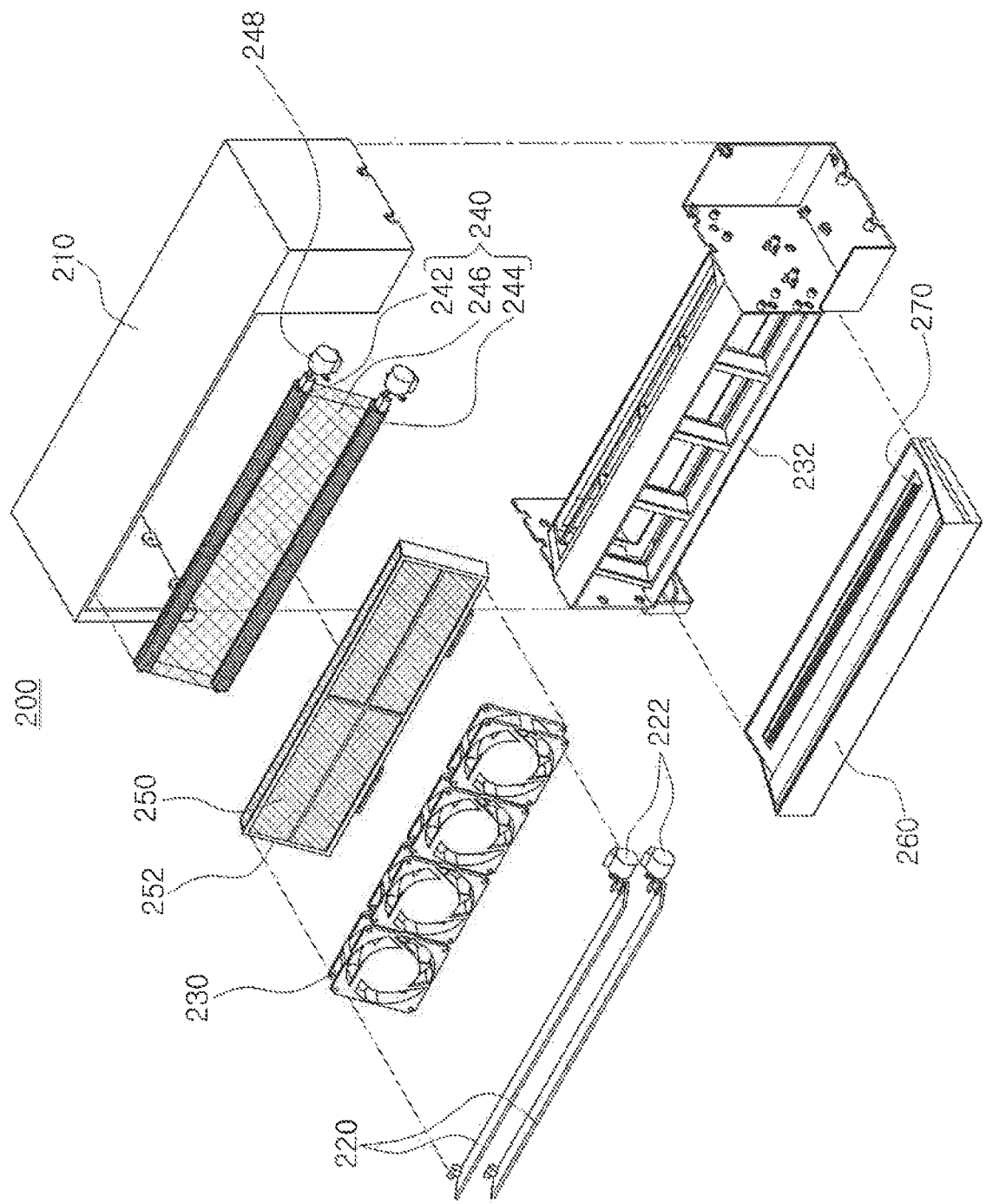
[FIG.22]

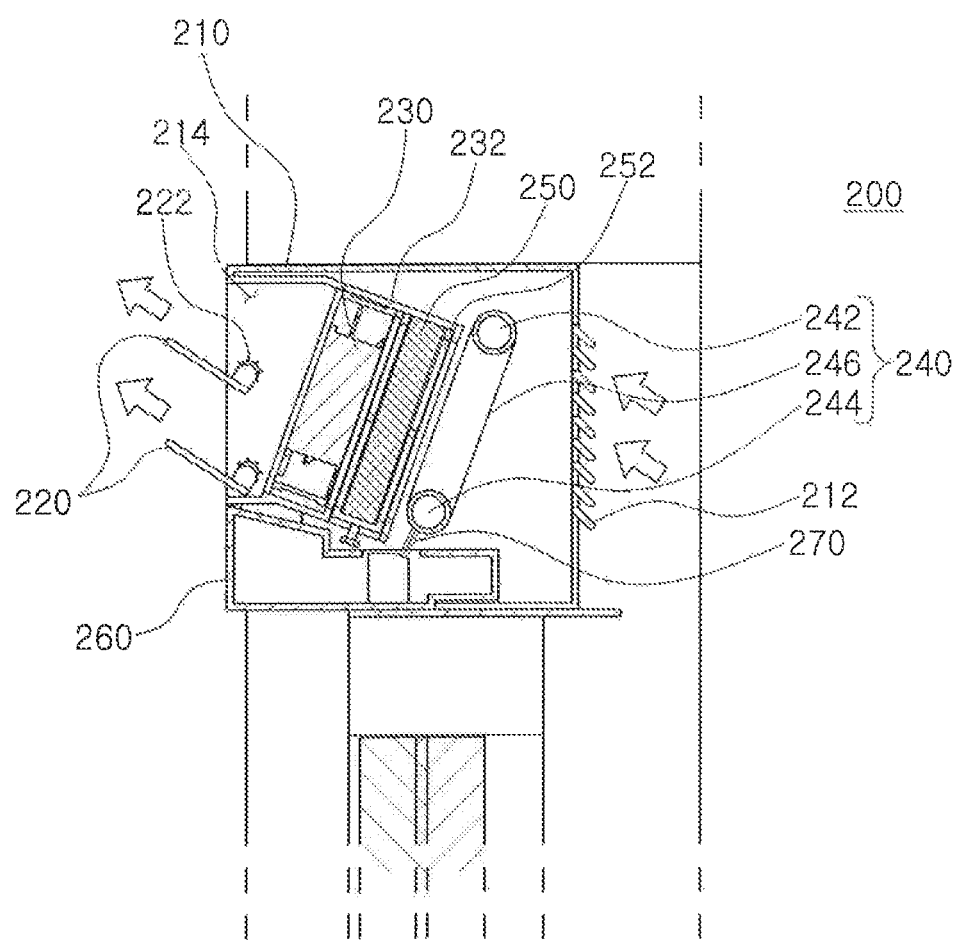
[FIG.23]

[FIG.24]
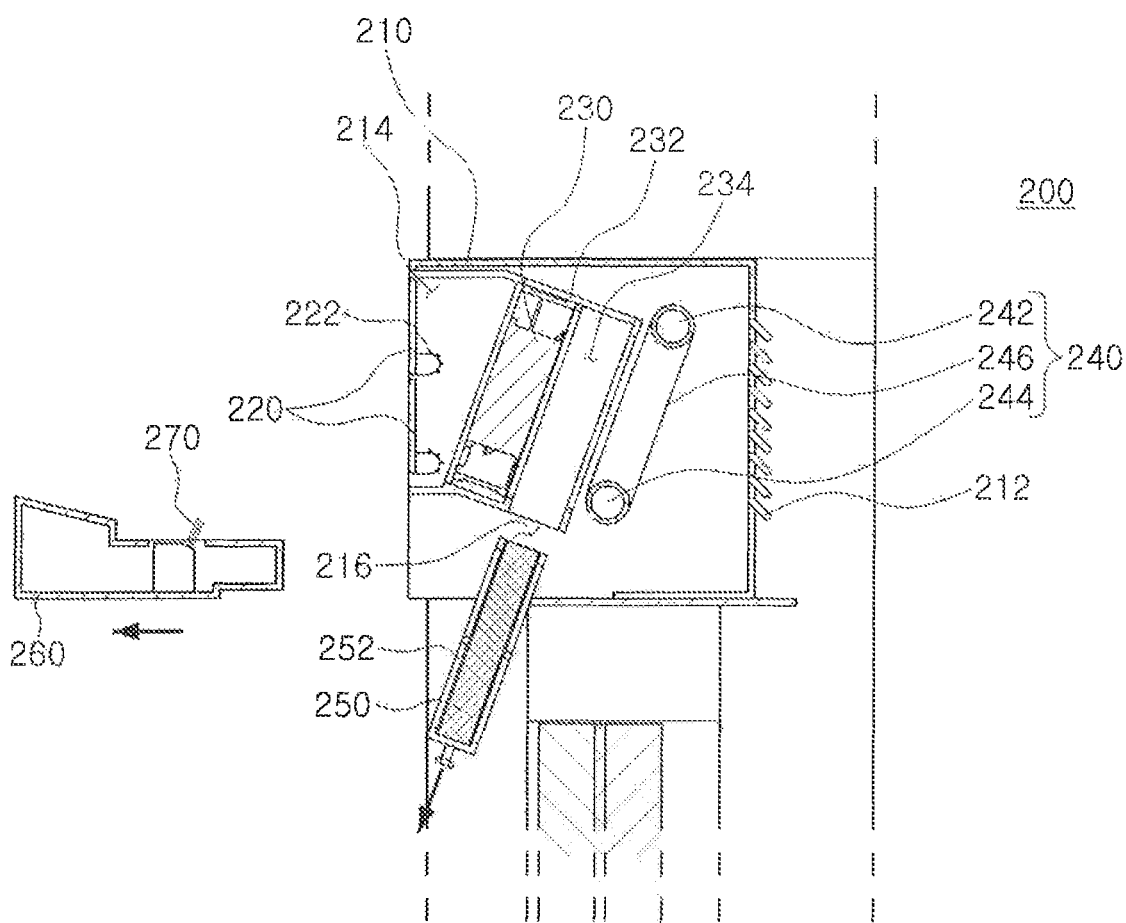

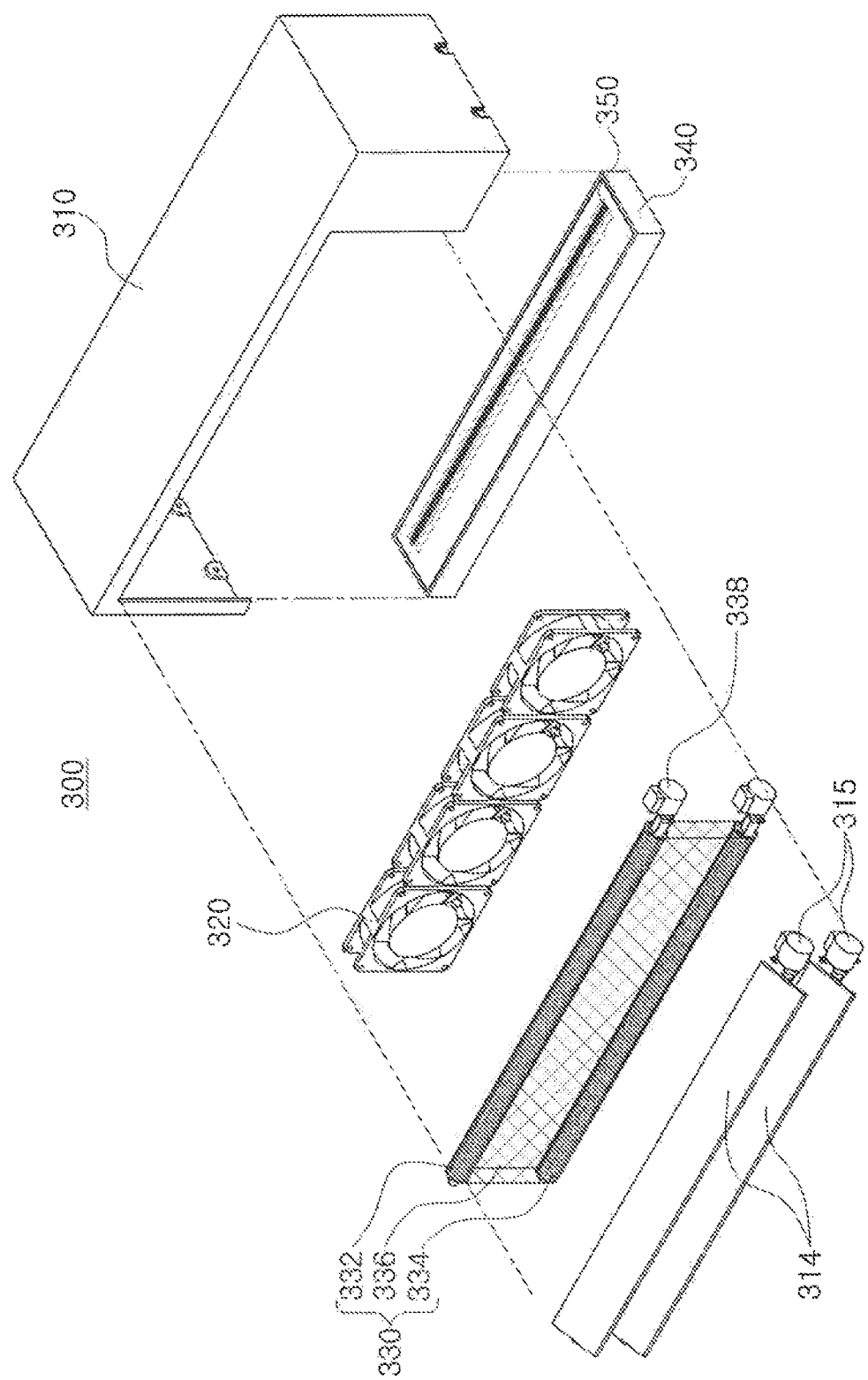
[FIG.25]

[FIG.26]
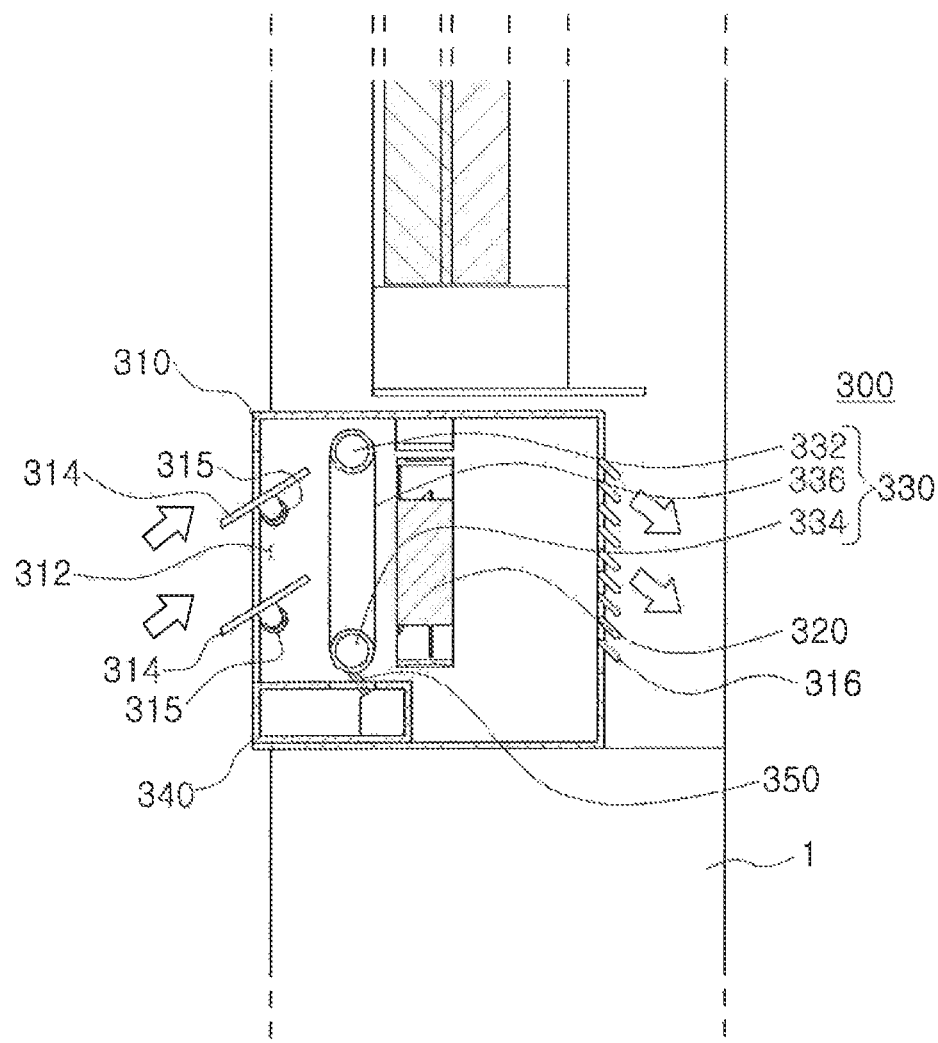

[FIG.27]
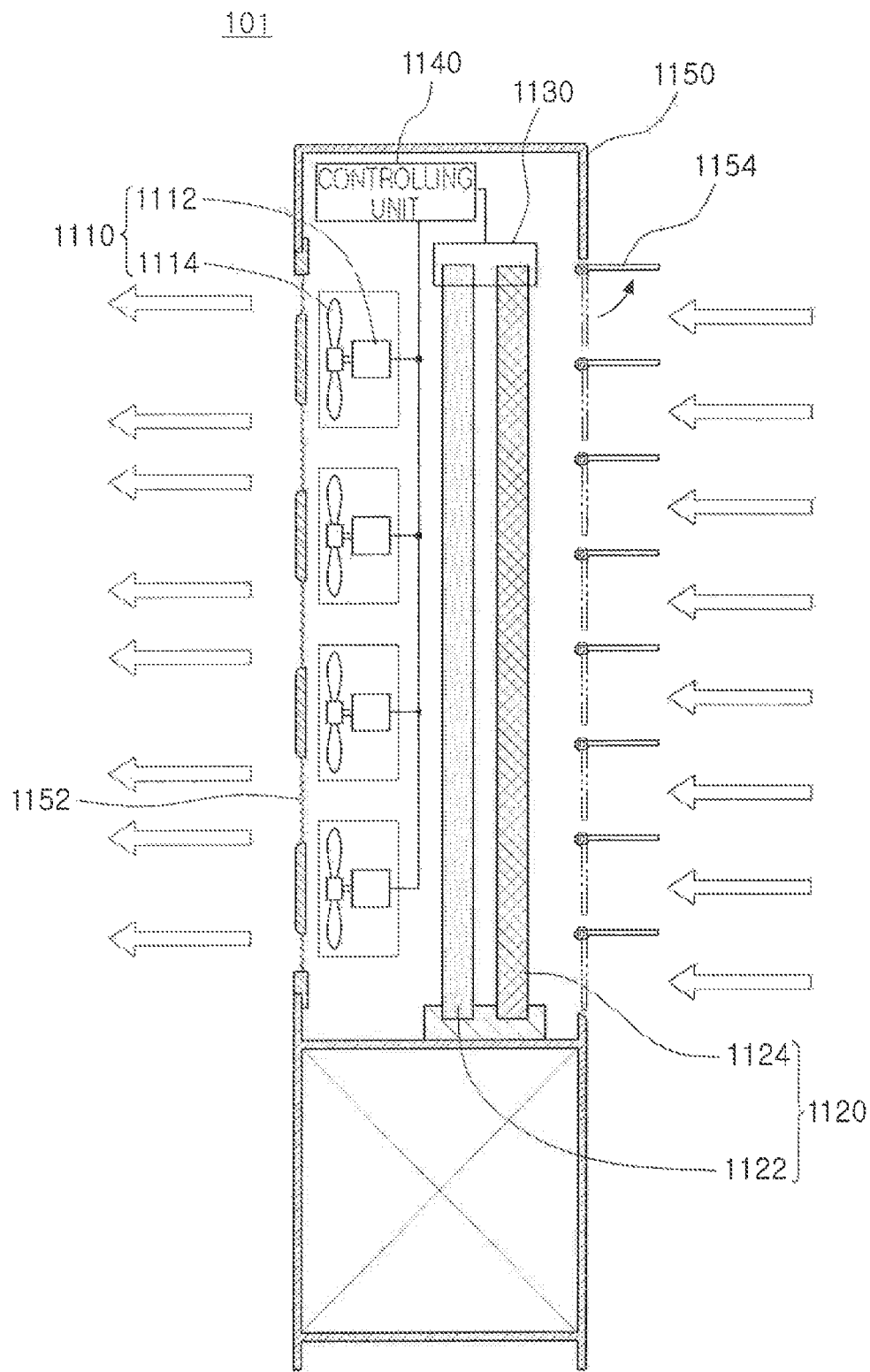

[FIG.28]
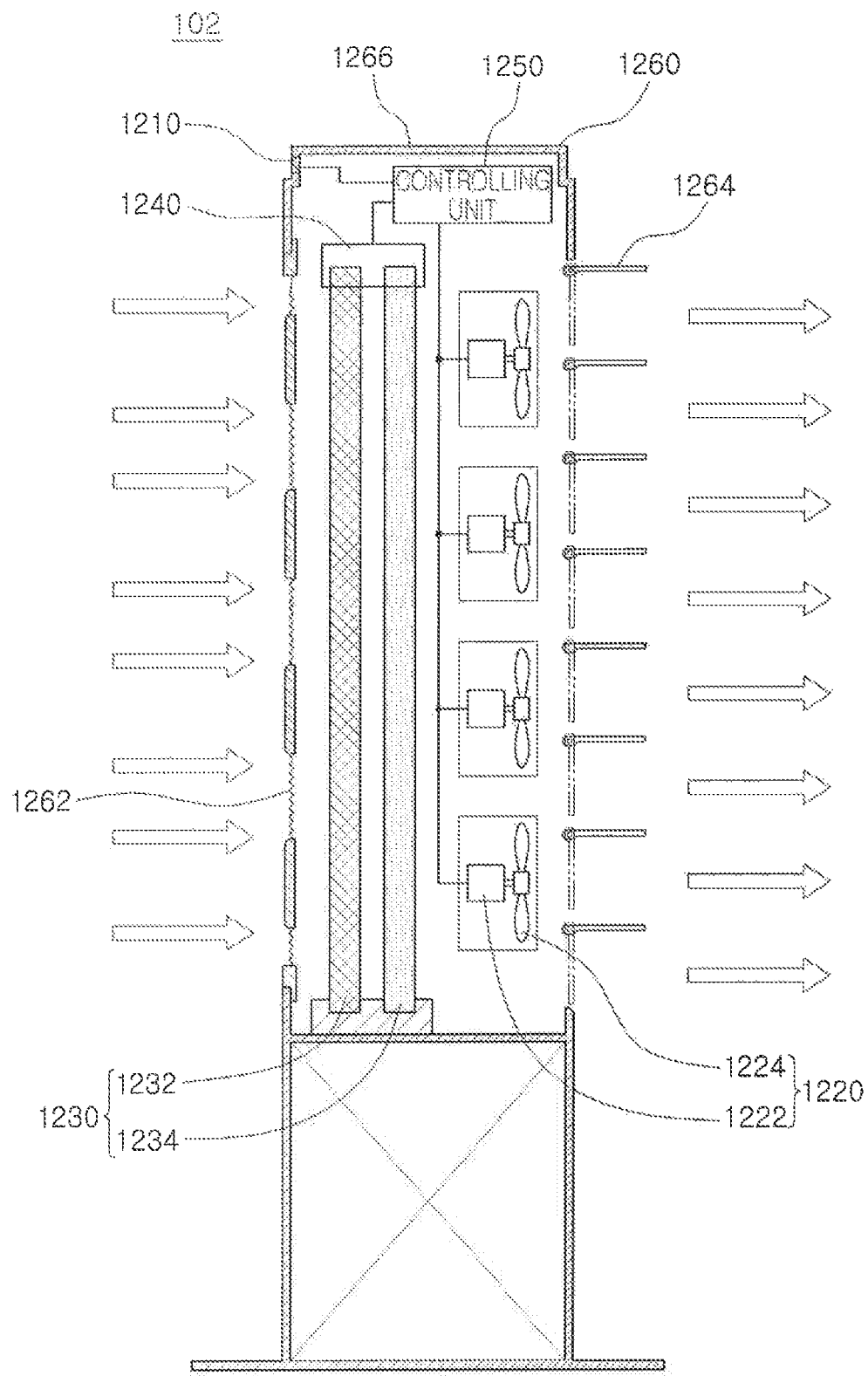

ical Application Number PCT/KR2017/000110 filed under the Patent Cooperation Treaty having a filing date of Jan. 4, 2017, which claims priority to Korean Patent Application Serial Number 10-2016-0000995 having a filing date of Jan. 5, 2016, Korean Patent Application Serial Number 10-2016-0000940 having a filing date of Jan. 5, 2016, Korean Patent Application Serial Number 10-2016-0000992 having a filing date of Jan. 5, 2016, Korean Patent Application Serial Number 10-2016-0010877 having a filing date of Jan. 28, 2016, and Korean Patent Application Serial Number 10-2016-0010881 having a filing date of Jan. 28, 2016, which are incorporated herein by reference.

AIR PURIFYING UNIT AND AIR CLEANING/VENTILATION DEVICE COMPRISING SAME

CROSS REFERENCE TO RELATED APPLICATIONS

This application is the U.S. National Stage entry of International Application Number PCT/KR2017/000110 filed under the Patent Cooperation Treaty having a filing date of Jan. 4, 2017, which claims priority to Korean Patent Application Serial Number 10-2016-0000995 having a filing date of Jan. 5, 2016, Korean Patent Application Serial Number 10-2016-0000940 having a filing date of Jan. 5, 2016, Korean Patent Application Serial Number 10-2016-0000992 having a filing date of Jan. 5, 2016, Korean Patent Application Serial Number 10-2016-0010877 having a filing date of Jan. 28, 2016, and Korean Patent Application Serial Number 10-2016-0010881 having a filing date of Jan. 28, 2016, which are incorporated herein by reference.

TECHNICAL FIELD

The present disclosure relates to an air purifying unit and an air cleaning/ventilation device comprising the same. More particularly, the present disclosure relates to an air purifying unit and an air cleaning/ventilation device comprising the same, capable of use as an air ventilation device installed in a wall and an air cleaning device disposed indoors.

BACKGROUND ART

Generally, a ventilation device is installed in a window or a wall of a building and performs a function of ventilating indoor air and purifying outdoor air, while introducing the air to an indoor space. However, since the ventilation device according to a related art is fixedly installed in a window or a wall to only perform a function of ventilation to circulate air between indoor and outdoor, usability of the device may be low.

In addition, since the ventilation device based on the related art, in which an outdoor air introduction unit introducing outdoor air to an indoor space and indoor air discharge unit discharging indoor air outdoors are comprised of a single device, the ventilation device has low usability and may not be able to perform a function other than ventilating indoor air.

Thus, the ventilation device based on the related art, fixedly installed in a window or a wall, as described above, is disclosed in Korean Patent Laid-Open Publication No. 2014-0110454.

Meanwhile, the ventilation device or the air cleaning device based on the related art is composed of a fan guide in which a blowing fan is coupled to the device internally, and a filter guide frame to which the filter is mounted, configured as separate parts, and which are attached to each other inside the device.

However, in the structure in which the fain guide and the filter guide frame are separate from each other, a problem in which air leaks through the joints of the fan guide and the filter guide frame may occur when attaching the fan guide and the filter guide frame, a separate sealing treatment is required to prevent leakage of the air, and an assembly is difficult due to a large number of parts.

DISCLOSURE

Technical Problem

An aspect of the present disclosure is to provide an air purifying unit in which leakage of the air flowing between a filter and a blowing fan is significantly reduced, and an air cleaning/ventilation device including the same.

An another aspect of the present disclosure is to provide an air purifying unit detachably installed in a window, used as a ventilation device, and used as an indoor air cleaning device, and an air cleaning/ventilation device including the same.

Technical Solution

According to an aspect of the present disclosure, an air purifying unit includes: a housing provided with an air intake unit on one side and an air discharge unit on the other side; a blowing fan provided inside the housing; an air purifier installed, between the air intake unit and the blowing fan to purify air; and a fan guide provided inside the housing, configured to surround an outer periphery of the blowing fan and to accommodate the air purifier, to form an integrated air flow path between the blowing fan and the air purifier.

According to another aspect of the present disclosure, an air cleaning/ventilation device includes a plurality of the air purifying units and each of the plurality of the air purifying units independently performs an air purifying operation.

According to an aspect of the present disclosure, the air cleaning/ventilation device may include a first air purifying unit and a second air purifying unit which may be installed in a window and purify the air by intaking air on one side and discharging air on the other side.

At this time, the first air purifying unit and the second purifying unit are disposed vertically or horizontally and may be fastened to each other, in a case in which the first air purifying unit and the second air purifying unit are fastened to each other and installed in a window, the first air purifying unit and the second air purifying unit may operate the first air purifying unit to purify and introduce indoor air and the second air purifying unit to discharge the indoor air outdoors.

In addition, in an exemplary embodiment, the second air purifying unit may include a coupling sensing unit sensing whether coupling to the first air purifying unit and may determine a rotation direction of the blowing fan according to whether coupling to the first air purifying unit.

Advantageous Effects

According to an exemplary embodiment in the present disclosure having such a configuration, a fan guide supporting a blowing fan is extended to receive a pre-filter and an air purifying filter, and an effect of leakage of air flowing between the blowing fan, the pre-filter and the air-purifying filter is significantly reduced may be obtained.

According to an aspect of the present disclosure, an effect of increasing a use range of the device may be obtained, since it is installed in a window and may be used as a ventilation device or as an indoor air purifying device.

DESCRIPTION OF DRAWINGS

FIG. 1 is a front view of an air cleaning/ventilation device according to an exemplary embodiment in the present disclosure installed in a window from an indoor view.

FIG. 2 is a rear view illustrating an air cleaning/ventilation device illustrated in FIG. 1 is installed in a window from an outside view.

FIG. 3 is a perspective view illustrating a state in which the air cleaning/ventilation device illustrated in FIG. 1 is detached from a window.

FIG. 4 is a perspective view of the first air purifying unit included in the air cleaning/ventilation device illustrated in FIG. 1.

FIG. 5 is a side cross-sectional view of the first air purifying unit illustrated in FIG. 4.

FIG. 6 is a perspective view illustrating an air purifier and a dust tray of the first air purifying unit illustrated in FIG. 4.

FIG. 7 is a side cross-sectional view illustrating an operating state of the first air purifying unit illustrated in FIG. 4.

FIG. 8 is a perspective view of the second air purifying unit included in the air cleaning/ventilation device illustrated in FIG. 1.

FIG. 9 is a side cross-sectional view of the second air purifying unit illustrated in FIG. 8.

FIG. 10 is a perspective view illustrating that an air purifier and a dust tray of the second air purifying unit are detached illustrated in FIG. 8.

FIG. 11 is a side cross-sectional view illustrating an operating state of the second air purifying unit illustrated in FIG. 8.

A and B of FIG. 12 are a front perspective view and a rear perspective view of the first fan guide included in the first air purifying unit illustrated in FIG. 4.

A and B of FIG. 13 are a front perspective view and a rear perspective view of the second fan guide included in the second air purifying unit illustrated in FIG. 8.

FIG. 14 is a side cross-sectional view of the air purifying unit according to another exemplary embodiment in the present disclosure.

FIG. 15 is a side cross-sectional view illustrating an air purifying operation of the air purifying unit illustrated in FIG. 14.

FIG. 16 is a perspective view illustrating a roll filter, an inner brush, and an outer brush included in the air purifying unit illustrated in FIG. 14.

FIG. 17 is a plan view of the inner brush illustrated in FIG. 17.

FIG. 18 is a side view illustrating the roll filter, the inner brush and the outer brush illustrated in FIG. 16.

FIG. 19 is a perspective view of a ventilation device according to another exemplary embodiment in the present disclosure installed in a wall from an indoor side.

FIG. 20 is a perspective view of the ventilation device illustrated in FIG. 19 installed in a wall from an outdoor side.

FIG. 21 is a side cross-sectional view illustrating a ventilation operation of the ventilation device illustrated in FIG. 19.

FIG. 22 is an exploded perspective view of the first air purifying unit included in the ventilation device illustrated in FIG. 19.

FIG. 23 is a side cross-sectional view of the first air purifying unit illustrated in FIG. 22.

FIG. 24 is a side cross-sectional view illustrating the air purifying filter separation structure of the first air purifying filter illustrated in FIG. 22.

FIG. 25 is an exploded perspective view of the second air purifying unit included in the ventilation device illustrated in FIG. 19.

FIG. 26 is a side cross-sectional view of the second air purifying unit illustrated in FIG. 25.

FIG. 27 is a side cross-sectional view of the first air purifying unit included in the air ventilation device according to another aspect in the present disclosure.

FIG. 28 is a side cross-sectional view of the second air purifying unit included in the ventilation device according to another exemplary embodiment in the present disclosure.

BEST MODE FOR INVENTION

The terminology used herein is for the purpose of describing particular exemplary embodiments only and is not intended to limit the present disclosure. Furthermore, the singular expressions herein include plural expressions unless the context clearly indicates otherwise.

Hereinafter, exemplary embodiments of the present disclosure will be described in detail with reference to the accompanying drawings.

First, referring to FIGS. 1 to 3, a description will be given of an air cleaning/ventilation device 100 according to an exemplary embodiment in the present disclosure.

As illustrated in FIGS. 1 to 3, the air cleaning/ventilation device 100 according to an exemplary embodiment in the present disclosure may include a first air purifying unit 101 and a second air purifying unit 102.

Here, the window 1 is a concept including a window and a door, which means an entrance door, a window, a living room window, or a veranda window through which air may flow between an indoor space and the outdoors.

The first air purifying unit 101 may be configured as an independent device in which a wall 1 may be mounted in an open space illustrated in FIGS. 1 and 2.

Such a first air purifying unit 101 may intake air on one side and purify the air, and discharge the air on the other side.

In an exemplary embodiment, the first air purifying unit 101 may intake air on the outdoor side disposed at the outdoor side, purify the air and discharge the air on the indoor side disclosed at the indoor side when the first purifying unit 101 is installed in the window 1.

The second air purifying unit 102 may be configured as an independent device which may be installed in the open space of the window 1 as illustrated in FIGS. 1 and 2.

Such a second air purifying unit 102 may purify air by intaking the air on one side and discharge the air on the other side in the same manner as the first air purifying unit 101.

In an exemplary embodiment, the second air purifying unit 102 may intake air on the indoor side disposed on the indoor side, purify the air, and discharge the air on the outdoor side disposed on the outdoor side, as opposed to the first air purifying unit 101, when the second air purifying unit 102 is installed in the wall 1.

The first air purifying unit 101 and the second air purifying unit 102 may independently perform an air purifying operation.

In detail, the first air purifying unit 101 and the second purifying unit 102 may have an air purifying function respectively, purifying the indoor air while intaking air on one side and purifying the air, to discharge the purified air to the other side.

Further, in an exemplary embodiment, the first air purifying unit 101 and the second air purifying unit 102 may be vertically or horizontally disposed and fastened to each other, and may be installed in the window 1 in a fastened state.

On the other hand, when the first air purifying unit 101 and the second air purifying unit 102 are fastened to each other and installed in the window 1, the first air purifying unit 101 may purify the outdoor air and introduce the air indoors, and the second air purifying unit 102 may discharge indoor air outdoors.

For example, the air cleaning/ventilation device 100 according to an exemplary embodiment in the present disclosure includes the first air purifying unit 101 and the second air purifying unit 102 capable of independently performing an air purifying function. In a case in which the first air purifying unit 101 and the second air purifying unit 102 are separated from the window 1 and disposed indoors and operated, the first air purifying unit 101 and the second air purifying unit 102 may configure the two air cleaning devices.

Moreover, the air cleaning/ventilation device according to an exemplary embodiment in the present disclosure may perform an air introduction unit function introducing purified outdoor air and the second air purifying unit 102 may perform an air discharge unit function discharging indoor air outdoors, when the first air purifying unit 101 and the second air purifying unit 102 are fastened to each other and installed in the window or wall and used as a ventilation device.

In this regard, when the first air purifying unit 101 and the second air purifying unit 102 are fastened to each other and installed in the window or the wall, even though, for example, the first air purifying unit 101 may be disposed on the upper part of the second air purifying unit 102 in such a manner that indoor air may be circulated up and down as the outdoor air flows into the upper part of an indoor space, but is not limited thereto.

Hereinafter, referring to FIGS. 4 to 11, the first air purifying unit 101 and the second air purifying unit 102 comprising the air cleaning/ventilation device according to an exemplary embodiment in the present disclosure will be described.

First, as illustrated in FIGS. 4 to 7, the first air purifying unit 101 may include a housing 110, a blowing ran 120, a pre-filter unit 130, an air purifier 140, a first fan guide 191, a dust tray 150, and an outer brush 161.

In addition, as illustrated in FIGS. 8 to 11, the second air purifying unit 102 may include a housing 110, a blowing fan 120, a pre-filter unit 130, an air purifier 140, a dust tray 150 and an outer brush 161, in the same manner as the first air purifying unit 101.

Meanwhile, the second air purifying unit 102 may include a second fan guide 192 having a different shape from the first fan guide 191 of the first air purifying unit 101.

The housing 110 comprises an outer appearance of the first air purifying unit 101 and the second air purifying unit 102 and may provide an inner space in which a blowing fan 120, a pre-filter unit 130, an air purifier 140, and a dust tray 150 are received.

The housing 110 may have an air intake unit 112 in which outdoor air is intaken inside the housing 110 on one side (front surface or rear surface), and an air discharge unit 116 in which indoor air is discharged to the outside of the housing 110 on the other side (rear surface or front surface).

In an exemplary embodiment, in the first air purifying unit 101, the air intake unit 112 may be provided on the rear surface of the housing 110 and the air discharge unit 116 may be provided on the front surface of the housing 110.

On the contrary, in the second air purifying unit 102, the air intake unit 112 may be provided in the front surface of the housing 110 and the air discharge unit 116 may be provided in the rear surface of the housing 110.

In this point, the air intaking and discharging directions of the housing 110 of the first air purifying unit 101 and the second air purifying unit 102 may be determined by the rotating direction of the blowing fan 120 provided inside the housing 110.

In addition, in an exemplary embodiment, a intake louver 113 for opening and closing the air intake unit 112 may be provided in the first air purifying unit 101.

An intake louver 113 opens the air intake unit 112 when the first air purifying unit 101 is operated, and closes the air intake unit 112 when the operation of the first air purifying unit 101 is stopped, and foreign materials may be prevented from flowing inside the housing 110.

In an exemplary embodiment, the intake louver 113 may be opened and closed by an operation motor 114 provided inside the housing 110 and a link member 115 transmitting the power of the operation motor 114 to the intake louver 113.

The intake louver 113 may be disposed outdoors when the first air purifying unit 101 is installed on the window 1.

The air discharge unit 116 of the housing 110 of the first air purifying unit 101 may be provided with a grill.

On the other hand, in an exemplary embodiment, the discharge louver 116 for opening and closing the air discharge unit 116 may be provided in the second air purifying unit 102.

The discharge louver 116 opens the air discharge unit 116 when the second air purifying unit 102 is operated and closes the air discharge unit 116 when an operation of the second air purifying unit 102 is stopped, and thereby, foreign materials may be prevented from flowing inside the housing 110.

In an exemplary embodiment, the discharge louver 116 may be opened and closed by the operation motor 114 and the link member 115 in the same manner as the intake louver 113.

For example, in an exemplary embodiment, the discharge louver 116 and the intake louver 13 may have substantially the same configuration, but are not limited thereto.

The discharge louver 116 may be disposed outdoors when the second air purifying unit 102 is installed in the window 1.

In detail, when the air cleaning/ventilation device 100 is used to perform an indoor ventilation operation, the air intake unit 112 of the first air purifying unit 101 and the air discharge unit 116 of the second air purifying unit 102 may be disposed outdoors, and the air discharge unit 116 of the first air purifying unit 101 and the air intake unit 112 of the first air purifying unit 101 may be disposed indoors.

The blowing fan 120 is provided inside the housing 110, and the air flow may be generated so that the outside air is intaken inside the housing 110 through the air intake unit 112 and then discharged to the outside the housing 110 through the air discharge unit 116.

The blowing fan 120 is not particularly limited, and may be configured as a variety of fan devices capable of adjusting the wind speed by controlling a RPM of the blades disclosed in the related art.

FIGS. 4 to 11 illustrates an exemplary embodiment in which an axial flow fan in which the blowing fan 120 intakes air in an axial direction and discharges the air in the axial direction. However, the present disclosure is not limited thereto, and various types of fans such as a centrifugal fan, a side flow fan, and a mixed flow fan, and the like.

The pre-filter unit 130 is provided between the air intake unit 112 and the blowing fan 120, and may filter relatively large dust particles in the air intaken into the air intake unit 112.

In an exemplary embodiment, the pre-filter unit 130 may include an upper winding roller 132 disposed at the upper end of the blowing fan 120, a lower winding roller 134 disposed at a lower end of the blowing fan 120, and a roll filter 136 wound in belt form on the upper winding roller 132 and the lower winding roller 134 and rotating.

At this time, the roll filter 136 is made of a breathable material through which air may pass, and may filter a relatively large dust particle in the air passing therethrough.

In such a configuration, the roll filter 136 may be rotated in accordance with the rotation of the upper winding roller 132 and the lower winding roller 134.

Further, in an exemplary embodiment, the roll filter 136 may be provided in two layers in front of the blowing fan 120 (in a direction in which air is intaken) through a structure in a belt form on the upper winding roller 132 and the lower winding roller 134.

Thus, the roll filter 136 which is provided in two layers has an advantage of being excellent in dust filtration performance, since the roll filter may filter dust doubly.

The air purifier 140 is provided between the pre-filter unit 130 and the blowing fan 120, and may remove a fine dust particle, odors, bacteria and viruses, and the like in the air.

For example, the air purifier 140 may be drawn in and drawn out from the outside of the housing 110 to the inside the housing 110, as illustrated in FIGS. 6 and 10.

For this, in an exemplary embodiment, the air purifier 140 may include a filter frame 142 which is slid and may be drawn out to the outside of the housing 110 and an air purifying filter 144 mounted in the filter frame 142.

In an exemplary embodiment, the filter frame 142 may be provided with a filter mounting unit 118 in which the filter frame 142 is drawn into the housing 110.

Here, the air purifying filter 144 may be mounted in the filter frame 142 and detached from the filter frame.

For example, the air purifying filter 144 may be formed of a HEPA filter capable of removing a fine dust particle, odors, and bacteria and viruses in the air passing therethrough. However, the present disclosure is not limited thereto. Another type of single filter or a plurality of filters having various functions may be configured in a superimposed manner.

In such a configuration, a user may easily replace and clean the air purifying filter 144 by drawing out the filter frame from outside the housing 110. When the user does not want to use the air purifying filter 144, the first air purifying unit 101 and the second air purifying unit 102 may be used while only the filter frame 142 is drawn into the housing 110 after removing the air purifying filter in the filter frame 142.

The first fan guide 191 is provided inside the housing 110 of the first air purifying unit 101 and a structure supporting the blowing fan 120, the pre-filter unit 130, and the air purifier 140.

As illustrated in A and B of FIG. 12, such a fan guide 191 integrally surrounds the outer peripheries of the blowing fan 120, the pre-filter unit and air purifier 140, such that leakage of the air flowing into the roll filter 136, the air purifying filter 144 and the blowing fan 120 may be significantly reduced.

For this, in an exemplary embodiment, the first fan guide 191 may have a fan casing unit 194 having the blowing fan 120 coupled to the inside thereof and a pre-filter casing unit 195 having a pre-filter unit 130 coupled to the inside thereof, and a purifying filter casing unit 196 having the air purifier 140 coupled to the inside thereof.

Here, the fan casing unit 194, the pre-filter casing unit 195, and the purifying filter casing unit 196 of the first fan guide 191 may be integrally injection molded.

In detail, the first fan guide 191 may have a hollow duct structure surrounding the outer periphery of the blowing fan 120, and may be extended in the direction of an air intake to surround the outer periphery of the air purifying filter 144 and a roll filter 136.

In addition, in an exemplary embodiment, a drawn-out/in groove 198 for drawing out and in the filter frame 142 from the outside the housing 110 may be provided on one side of the purifying filter casing unit 196.

The first fan guide 191 is formed by integrally forming an air flow path in which the pre-filter unit 130, the air purifier 140, and the blowing fan 120 are disposed inside. The first fan guide 191 may significantly reduce the leakage of air in the direction of bypassing the roll filter 136 and the air filter 144 by the blowing fan 120.

Meanwhile, a second fan guide 132 may be installed in the second air purifying unit 102 instead of the first fan guide 191.

The second fan guide 192 is provided inside the housing of the second air purifying unit 102 in the same manner as the first fan guide 191, is a structure supporting the blowing fan 120, the pre-filter unit 130, and the air purifier 140.

As illustrated in A and B of FIG. 13, the second fan guide 192 integrally surrounds the outer peripheries of the blowing fan 120, the pre-filter unit 130, and the air purifier 140, such that leakage of the air flowing into the roll filter 136, the air filter 144, and the blowing fan 120 may be significantly reduced.

For this, in an exemplary embodiment, the second fan guide 192, in the same manner as the first fan guide 191, may include the fan casing unit 194 having the blowing fan 120 is coupled to the inside thereof, the pre-filter casing unit 195 having the pre-filter unit 130 is coupled to the inside thereof, and the purifying filter casing unit 196 having the air purifier 140 is coupled to the inside thereof, and the drawn-out/in groove 198 on one side of the purifying filter casing unit 196 for drawing the purifying filter casing unit 196 in and out from the outside of the housing.

In addition, in such a second fan guide 192, in the same manner as the first fan guide 191, the fan casing unit 194, the pre-filter casing unit 195, and the purifying filter casing unit 196 may be integrally injection molded, and is constituted by a hollow duct structure surrounding the outer periphery of the blowing fan 120, and may be extended in the air intake side direction of the blowing fan 120, to surround the outside of the purifying filter 144 and the roll filter 136.

In an exemplary embodiment, the difference between the first fan guide 191 and the second fan guide 192 is directionality of an arrangement structure in which the fan casing unit, the pre-filter casing unit 195 and the purifying filter casing unit 196 are formed.

In other words, the fan casing unit 194 is provided at the front end of the purifying filter casing unit 196 and the pre-filter casing unit 195 is provided at the rear end of the purifying filter casing unit 196, based on the front-rear direction of the housing 110 of the first air purifying unit 101 in the first fan guide 191.

On the contrary, the free-filter casing unit 195 is provided at the front end of the purifying filter casing unit 196 and the fan casing unit 194 is provided at the rear end of the purifying filter casing unit 196, based on the front-rear direction of the housing 110 in the second fan guide 192.

Through the structure of the first fan guide 191 and the second fan guide 192, the first air purifying unit 101 and the second air purifying unit 102 are configured, such that the air filtered by the roll filter 136 and the air purifying filter 144 to flow into the blowing fan 120.

The air cleaning/ventilation device 100 according to an exemplary embodiment in the present disclosure may significantly reduce the contamination of the blowing fan 120 by the contaminated air by allowing the air filtered by the filter to be intaken into the blowing fan 120.

The dust tray 150 is provided below the roll filter 136, and may store the dust which is collected in the roll filter 136 and falls.

In an exemplary embodiment, the dust tray 150 provided in the first air purifying unit 101 may be drawn out to the other side (front surface) of the housing 110 as illustrated in FIG. 6, and the dust tray 150 provided in the second air purifying unit 102 may be drawn out to one side (front surface) of the housing 110 of the housing 110 as illustrated in FIG. 10.

For this, in an exemplary embodiment, in the front surface of the housing 110 of the first air purifying unit 101 and the second air purifying unit 102, a tray mounting groove 119 through which the dust tray 150 is drawn out and drawn in may be provided.

Although not illustrated, the first air purifying unit 101 and the second air purifying unit 102 are provided with a sensor sensing the weight or stacking height of dust stored in the dust tray 150, and may have a function of informing a user of the dust removal time stored in the dust tray 150.

The outer brush 161 is provided in the dust tray 150 and may brush the surface of the roll filter 136 according to the rotation of the roll filer 136.

In an exemplary embodiment, the outer brush 161 is provided in order to abut on the outer surface of the roll filter 136 when the dust tray 150 is drawn into the housing 110, the dust collected in the roll filter 136 may be collected by brushing the surface of the roll filter 136 by the rotation of the roll filter 136.

At this time, the dust collected by the outer brush 161 falls and may be stored in the dust tray 150.

The outer brush 161 performs a function to automatically clean the roll filter 136 when the first air purifying unit 101 operates.

When the first air purifying unit 101 as described above is operated, the intake louver 113 is opened and the blowing fan 120 is rotated, as illustrated in FIG. 7, the air is intaken inside the housing 110 through the air intake unit 112 and may be discharged through the air discharge unit 116 after passing through the roll filter 136 and the air purifying filter 144.

As illustrated in FIGS. 1 and 2, when the first air purifying unit 101 is installed in the window 1, the air intake unit 112 is disposed outdoors and the air discharge unit 116 is disposed indoors. And the outdoor air may be intaken and purified and then introduced indoors.

In addition, when the first air purifying unit 101 is detached from the window 1 and disposed indoors and operated, the indoor air is intaken through the air intake unit 112 to be purified, and then the air is discharged through the air discharge unit 116, and may be used as an air cleaning device for purifying the indoor air by discharging the air indoors again.

Meanwhile, in an exemplary embodiment, the first air purifying unit 101 may include a power plug 170 for supplying power to the lower end thereof.

In this time, the electric wire connected to the power plug 170 may be disposed inside the housing 110, may be drawn out to the outside as necessary.

In addition, when the second air purifying unit 102 as described above is operated, as illustrated in FIG. 11, the discharge louver 116 is opened and the blowing fan 120 is rotated so that the air is intaken inside the housing 110 through the air intake unit 112 and may be discharged after passing the roll filter 136 and the air purifying filter 144 through the air discharge unit 116.

As illustrated FIGS. 1 and 2, when the second air purifying unit 102 is installed in the window 1, the air intake unit 112 is disposed indoors and the air discharge unit 116 is disposed outdoors, and then the indoor air may be intaken and discharged outdoors.

In this point, since the air discharged from indoors to outdoors does not need to be filtered, when the second air purifying unit 102 is installed in the window 1 and performs a function of indoor ventilation, the air purifying filter 144 should be removed from the filter frame 142.

At this time, in order to prevent the blowing fan 120 from being contaminated by the dust included in the indoor air, the roll filter 136 is preferably not removed.

Accordingly, in an exemplary embodiment, though the first air purifying unit 101 and the second air purifying unit 102 may be configured as a structure in which the pre-filter unit 130 is fixed to the inside the housing 110, but it is not limited thereto, the pre-filter unit 130 may be configured to be able to be drawn out from the housing 110 in the same manner as the air purifier 140.

Meanwhile, when the second air purifying unit 102 is detached from the window 1 and is disposed indoors and operated, the second air purifying unit is used as an air purifying device for purifying the indoor air by intaking the indoor air through the air intake unit 112 and purifying and then discharging the air outdoors again through the air discharge unit 116, in the same manner as the first air purifying unit 101.

Meanwhile, in an exemplary embodiment, the second air purifying unit 102 may be provided with the power plug 170 for supplying power to the lower end thereof in the same manner as the first air purifying unit 101 and the electric wire connected to the power plug 170 may be long drawn out to the outside.

And in an exemplary embodiment, when the first air purifying unit 101 and the second air purifying unit 102 are installed in the window 1 by being vertically fastened, as illustrated FIGS. 1 and 2, the first air purifying unit 101 may be connected to the power via the second air purifying unit 102.

For this, in an exemplary embodiment, when the second air purifying unit 102 may include an outlet 160 to which the power plug 170 of the air purifying unit 101 is connected when the first air purifying unit 101 is fastened.

In an exemplary embodiment, an outlet 180 may be provided in the upper end of the second air purifying unit 102. Here, the power plug 170 of the first air purifying unit 101 may not be exposed to the outside, since the electric wire is drawn inside the housing 110 of the first air purifying unit 101 and is shortly drawn out to the lower end of the first air purifying unit 101 and then coupled to the outlet 180 provided in the upper end of the second air purifying unit 102.

Then, when a power plug 170 of the first air purifying unit 101 is connected to an outlet 180 of the second air purifying unit 102 as described above, external power, in which the power plug 170 is connected of the second air purifying unit 102, may be supplied to the first air purifying unit 101 through the electric wire connected to the outlet 180 inside the housing 110 of the first air purifying unit 101.

Subsequently, the air purifying units 101 and 102 according to another exemplary embodiment in the present disclosure will be described with reference to FIGS. 14 to 18.

As illustrated in FIGS. 14 and 18, the air purifying units 101 and 102 according to another exemplary embodiment in the present disclosure may further include an inner brush 185 brushing the dust collected on the inner side-surface of the roll filter 136.

For example, when the roll filter 136 rotates, the outer brush 161 is configured to brush the dust collected on the outer side-surface of the roll filter 136, and then the inner brush 165 is configured to brush the dust collected on the inner side-surface of the roll filter 136. So the roll filter 136 may be brushed on both sides.

In an exemplary embodiment, the inner brush 165 may be formed of a bar-shaped brush body 166, a plurality of bristles which are formed on the brush body 166 toward the inner side-surface of the roll filter 136 and brush the inner side-surface of the roll filter 136.

Further, in an exemplary embodiment, the roll filter 136 may be rotated such that the side on which the inner brush 165 is contacted is moved downward. Accordingly, the dust collected on the inner side-surface may be collected at the upper end of the inner brush 165.

The inner brush 165 may be configured to have a straight bar-shape extending to both ends of the roll filter 136. Thereby, the entire inner side-surface of the roll filter 136 may be brushed by the rotation of the roll filter 136.

Further, in an exemplary embodiment, the inner brush 165 may be inclined downwardly to one end of the roll filter 136 as illustrated in FIG. 16. Thus, the dust accumulated on the upper end of the inner brush 165 is moved in the direction of one end of the roll filter 136 along the inclined surface of the inner brush 165 through the downwardly inclined structure toward one end of the roll filter 136 and then may be discharged to the outside of the roll filter 136 at one end of the inner brush 165.

Since the dust accumulated on the upper end of the inner brush 165 through the rotation of the roll filter 136 is continuously subjected to a downward load by a frictional force of the roll filter 136, a small amount of dust accumulated on the upper end of the inner brush 165 may be moved to one end of the roll filter 136 in the inclined direction of the inner brush 136.

At this time, the dust discharged from the one end of the inner brush 165 to the outside of the roll filter 136 may fall and be stored in the dust tray 150.

Further, in an exemplary embodiment, the brush bristles 167 of the inner brush 165 may be formed to be inclined in the direction of one end of the roll filter 136 in the brush body as illustrated in FIG. 6. Accordingly, the dust accumulated on the upper end of the brush bristles 167 may smoothly move in the direction of one end of the roll filter 136 in the inclined direction of the plurality of bristles 167.

In addition, to significantly reduce the inflow of the dust falling from one end of the inner brush into the inside the roll filter 136 again, the inner brush 165 is preferably disposed at one end close to the upper end of a lower winding roller 134.

Meanwhile, a support frame 166 may be provided inside the housing 110 supporting the inner brush 165 such that the inner brush 165 is located inside the roll filter 136.

In an exemplary embodiment, the support frame 168 may be rotatably coupled to a rotary shaft 135 of the lower winding roller 134 and extends upwards to be coupled to the brush body of the inner brush 165.

The support frame 168 is rotatably coupled to the rotary shaft 135 of the lower winding roller 134 such that the support frame 168 may maintain the position even when the rotary shaft 135 of the lower winding roller 134 is rotated.

In addition, in an exemplary embodiment, the support frame 168 may transmit a unit of the rotational force of the rotary shaft 135 of the lower winding roller 134 through the frictional force of the lower winding roller 134 and press the inner brush 165 against the inner side-surface of the roll filter 136.

In detail, since the rotating direction of the rotary shaft 135 of the lower winding roller 134 is the same as the rotating direction of the roll filter 136 as illustrated in FIG. 18, the support frame 168 tries to rotate in a same direction as the rotary shaft 135 by receiving a unit of the rotational force of the rotary shaft 135, according to the rotation of the rotary shaft 135 of the lower winding roller 134.

At this time, the inner brush 165 may be pressed to the inner side-surface of the roll filter 136 by the force with which the support frame 168 is about to rotate.

For this, the support frame 168 is rotatably coupled to the rotary shaft 135 of the lower winding roller, but may be coupled to generate a predetermined amount of frictional force therebetween.

Then, the inner brush 165 which receives the rotational force of the lower winding roller 134 may maintain a state of contact with the inner side-surface of the roll filter 136 and brush in a state of being pressed against the inner side-surface of the roll filter 136. And therefore, the brushing performance is improved.

In addition, in an exemplary embodiment, the support frame 168 may be formed on a plate covering one end of the roll filter 136 in a section between the inner brush 165 and the lower winding roller 134 to prevent dust falling into the dust tray 150 from flowing into the inside the roll filter 136 from one end of the inner brush 165.

As described above, the air purifying units 101 and 102 according to an exemplary embodiment in the present disclosure uses a rotary-type roll filter 136 as a pre-filter for primarily removing dust, is provided with the inner brush 165 for brushing the inner side-surface and outer side-surface of the roll filter 136 and the outer brush and therefore may automatically clean the roll filter 136 inside the housing 110.

In addition, in air purifying units 101 and 102 according to another exemplary embodiment in the present disclosure, an inner brush 165 brushing the inner side-surface of a roll filter 136 is inclined to one side, and so dust collected in inner side-surface of the roll filter 136 may be automatically discharged to the outside of the roll filter 136 without a separate discharge device.

Subsequently, a ventilation device 100 according to another exemplary embodiment in the present disclosure will be described with reference to FIGS. 19 to 26.

As illustrated in FIGS. 19 to 26, the ventilation device 100 according to another exemplary embodiment in the present disclosure may include a first air purifying unit 200 and a second air purifying unit 300.

The first air purifying unit 200 may be installed as a wall-mounted type unit, such that outdoor air may be introduced indoors. The first air purifying unit 200 may purify the outdoor air and introduce the air indoors.

In an exemplary embodiment, the first air purifying unit 200 is installed above the second air purifying unit 300 which will be described later as illustrated in FIGS. 19 to 21 and may discharge air to the upper portion of the indoor space.

A specific configuration of the first air purifying unit 200 will be described later with reference to FIGS. 22 to 24.

The second air purifying unit 300 may be installed as a wall-mounted type unit to penetrate the wall of the building in the same manner as the first air purifying unit 200, and unlike the first air purifying unit 200, the second air purifying unit 300 may discharge the indoor air outdoors.

In an exemplary embodiment, the second air purifying unit 300 is installed below the first air purifying unit 200 and may intake the air from the lower portion of the indoor space and discharge outdoors.

A specific configuration of the second air purifying unit 300 will be described later with reference to FIGS. 25 and 26.

Meanwhile, in the ventilation device 100 according to another exemplary embodiment in the present disclosure, as described above, the first air purifying unit 200 may be configured to discharge such that the purified outdoor air is inclined in the indoor ceiling direction. Accordingly, such a case that the air purified through the first air purifying unit 200 is intaken into the second air purifying unit 300 again without flowing widely to the entire indoor space may be prevented.

In detail, by discharging air in an indoor ceiling direction in the first air purifying unit 200, a reaching distance of the air discharged from the first air purifying unit 200 may be increased. Thereby, a circulating air flow which flows from the upper portion to the lower portion and is discharged to the outside across the entire indoor space may be formed.

For reference, since dust particles, odor particles are generally heavier than air and the concentrations of foreign materials are generally higher in the lower region than the upper region of the indoor space, in a case in which the purified air is flowed into the upper unit and the air existing in the lower region of the indoor space to the outside, such as the ventilation device 100 according to the exemplary embodiment in the present disclosure, the indoor air purifying efficiency is improved.

Subsequently, the first air purifying unit 200 according to an exemplary embodiment in the present disclosure will be described with reference to FIGS. 22 to 24.

As illustrated in FIGS. 22 to 24, the first air purifying unit 200 according to an exemplary embodiment in the present disclosure may include a housing 210, a discharge louver 220, a blowing fan 230, a fan casing 230, a pre-filter unit 240, an air purifying filter 250, a dust tray 260, and a brush member 270.

The housing 210 constitutes an outer appearance of the first air purifying unit 200 according to an exemplary embodiment in the present disclosure and makes an inner space in which the blowing fan 230, the pre-filter unit 240, the air purifying filter 250, and the dust tray 260 may be installed.

For example, the housing 210 may be installed in a mounted type penetrating through a wall or a ceiling structure of the building.

At this time, the housing 210 is provided with the air intake unit 212 at the outdoor side exposed to the outside, and the air discharge unit 214 may be provided at the indoor side-surface exposed to the inside.

The discharge louver 220 may be provided in the housing 210 to open and close the air discharge unit 214.

In an exemplary embodiment, the discharge louver 220 may open the air discharge unit 214 when the first air purifying unit 200 is operated, and close the air discharge unit 214 not to flow the outdoor air indoors.

In addition, the discharge louver 220 may guide a discharge direction of the air discharged from the air discharge unit 214 when the air discharge unit 214 is opened.

In an exemplary embodiment, the discharge louver 220 may be configured as a plate-shaped member rotatably coupled to the housing 210 up and down, and a rotational angle may be adjusted through a stepping motor 222.

In addition, in one exemplary embodiment, the discharge louver 220 may be rotated upwardly inclined to guide air in an upward inclined direction when the first air purifying unit 200 is operated as illustrated in FIG. 23. Accordingly, as described above, the first air purifying unit 200 in the present disclosure may discharge air in the indoor ceiling direction.

The blowing fan 230 is provided inside the housing 210 and may generate an air flow through which the outdoor air flows into the inside.

In an exemplary embodiment, the blowing fan 230 may be configured as an axial flow fan which intakes and discharges air in the axial direction, but is not limited thereto, and may include various types of fans such as a centrifugal fan, a mixed flow fan, and a side flow fan.

In addition, when the blowing fan 230 is constituted by the axial flow fan, the blowing fan 230, as illustrated in FIG. 5, though the blowing fan 230 is disposed in the upwardly inclined direction inside the housing 210 in order that the discharge direction is upwardly inclined corresponding to the flow of the air discharged in the upward inclined direction, but is not limited thereto and may be disposed in an upright form.

The fan casing 232 may support the blowing fan 230 inside the housing 210.

The fan casing 232 may surround the outer periphery of the blowing fan 230 and may be configured as a duct for guiding the air intaken into the housing 210 through the air intake unit 212 to the fan casing 232.

In an exemplary embodiment, the fan casing 232 may be extended such that the external structure surrounding the blowing fan 230 surrounds the outer periphery of the air purifying filter 150, which will be described later.

The structure of the fan casing 232 which integrally surrounds the outer periphery of the blowing fan 230 and the air purifying filter 140 forms the air flow path passing through the air purifying filter 250 and the blowing fan 230. Thereby, the generation of leaked air bypassing the air purifying filter 250 may be significantly reduced.

The pre-filter unit 240 is provided between the blowing fan 230 and the air intake unit 212 and may filter a relatively large dust particle in the air flowing from the air intake unit 212 to the blowing fan 230.

In an exemplary embodiment, the pre-filter unit 240 may include an upper winding roller 242, a lower winding roller 244, and a roll filter 246.

The upper winding roller 242 and the lower winding roller 244 may be disposed inside the housing 210 up and down, may be rotated by at least one of the upper winding roller 242 and the lower winding roller 244.

And, the roll filter 246 may rotate being wound in a belt form around the upper winding roller 242 and the lower winding roller 244.

The air purifying filter 250 is provided between the blowing fan 230 and the pre-filter unit 240 and may remove fine dust, odor, bacteria and viruses, which are not filtered from the roll filter 246 of the pre-filter unit 240.

For example, the air purifying filter 250 may be configured as a HEPA filter, but is not limited thereto, and may be configured to a filter having another air purifying function.

In addition, the air purifying filter 250 may be composed of a single filter or a filter assembly in which a plurality of filters having different functions are superimposed.

In an exemplary embodiment, the air purifying filter 250 maybe drawn out to the lower end of the housing 210 as illustrated in FIG. 24, but may be drawn out obliquely in the indoor side-surface direction of the housing 210.

For this, in an exemplary embodiment, the air purifying filter 250 may be mounted obliquely inside the housing 210 such that the lower end is closer to the indoor side-surface of the housing 210 than the upper end.

Specifically, the air purifying filter 250 may be mounted to a filter frame 252, and the filter frame 252 may be slidably coupled to the fan casing 232 fixed inside the housing 210. In this case, a filter mounting groove 234, such that the filter frame 252 may be coupled in an inclined direction may be formed.

Meanwhile, a filter outlet 216 may be formed at the lower end of the housing 210 to allow the air purifying filter 250 to be drawn out and drawn in.

Such a filter outlet 216 may be disposed on the indoor side when the housing 210 is installed in a wall-mounted type.

Therefore, the user may easily draw out the air purifying filter 250 indoors.

Alternatively, the structure in which the air purifying filter 250 is installed upright inside the housing 210 has a disadvantage which the device is bulky and harms an indoor aesthetics, since the body of the device should protrude from the wall to secure a space for drawing out the air purifying filter indoors up to the area in which the air purifying filter is mounted.

In addition, since the first air purifying unit 200 according to the exemplary embodiment in the present disclosure is formed, such that the air flow path is upwardly inclined inside the housing 210 as described above, the air purifying filter 250, which is arranged in an inclined manner, is disposed vertically to the flowing air, such that the negative pressure of the air passing through the air purifying filter 250 may be reduced.

The dust tray 260 is detachably attached to the lower end of the housing 210 and may store the dust falling after being collected by the roll filter 246 of the pre-filter unit 240.

In an exemplary embodiment, the dust tray 260 may be configured to be slid toward the indoor side-surface of the housing 210 and separated from the housing 210.

The dust tray 260 may be mounted in the housing 210 so as to cover the filter outlet 216 at the lower end of the housing 210.

The dust tray 260 supports the lower end of the filter frame 252, such that even though the air purifying filter 250 is removed from the filter mounting grove 234 of the fan casing 232 by vibration and other loads when the device is operated, the correct position of the air purifying filter 250 may be kept.

The user removes the dust tray 260 from the housing 210 and then draws out the air purifying filter 250 through the filter outlet 216.

Although not described, the first air purifying unit 200 according to an exemplary embodiment in the present disclosure includes a sensor (not described) sensing the weight or stacked height of dust stored in the dust tray 260 and functions to notify the user a removal time of dust, which is stored in the dust tray 260.

The brush member 270 is provided in the dust tray 260 and may brush the surface of the roll filter 246 based on the rotation of the roll filter 246.

In an exemplary embodiment, the brush member 270 is provided to abut the outer surface of the roll filter 246 when the dust tray 260 is mounted at the lower end of the housing 210 such that the dust collected in the roll filter 246 may be collected by brushing the surface of the roll filter 246 by the rotation of the roll filter 246.

At this time, the dust collected in the brush member 270 may fall and be stored in the dust tray 260.

The brush member 270 performs a function of automatically cleaning the roll filter 246 during operation of the first air purifying unit 200.

Subsequently, the second air purifying unit 300 will be described with reference to FIGS. 25 and 26.

As illustrated in FIGS. 25 and 26, the second air purifying unit 300 may include a main body 300, an exhaust fan 320, a dust removing unit 330, a dust collecting container 340, and a cleaning brush 350.

The main body 310 constitutes the outer appearance of the second air purifying unit 300 and provides an inner space through which the exhaust fan 320, the dust removing unit 330 and the dust collecting container 340 may be installed.

In an exemplary embodiment, the body 310 may be installed in a wall-mounted type to penetrate the wall or the ceiling structure of the building.

At this time, the main body 310 may have an air inlet 312 on the indoor side-surface exposed to indoors, and an air outlet 316 on the outdoor side-surface exposed to outdoors.

In addition, for example, the main body 310 may be provided with an intake louver 314 opening and closing an intake port 312.

In an exemplary embodiment, the intake louver 314 may open the intake port 312 during operation of the air purifying unit 300, and close the intake port 312 to allow the indoor air to be discharged outdoors or not to flow the outdoor air indoors when the second air purifying unit 300 is not operated.

In an exemplary embodiment, the intake louver 314 may be configured as a plate-shaped member rotatably coupled to the body 310 up and down, and the rotational angle may be adjusted through a stepping motor 315.

The exhaust fan 320 is provided inside the main body 310 to generate an air flow such that the indoor air intaken into the main body 310 through the intake port 312 and then discharged through the exhaust port 316.

Such an exhaust fan 320 is not particularly limited, and may be configured as various types of publicly-known fans.

The dust removing unit 330 is provided between the intake port 312 and the exhaust fan 320, and may filter relatively large dust particle included in the indoor air intaken in through the intake port 312.

Such a dust removing unit 330 is provided at the front end of the exhaust fan 320 on the basis of the direction of the air flow, such that dust in the air is removed to prevent the exhaust fan 320 from being contaminated by dust.

In an exemplary embodiment, the dust removing unit 330 an upper roller 221, a lower roller 334, and a dust filtering filter 336.

The upper roller 332 and the lower roller 334 may be vertically disposed inside the main body 310, and at least of the upper roller 332 and the lower roller 334 may be rotated by an operation motor 338.

And, the dust filtering filter 336 is wound in a belt form around the upper roller 332 and the lower roller 334 and may rotate, and collect dust in the air passing through the body.

The dust collecting container 340 is provided to be able to be drawn in and drawn out from the main body 310 and to store the falling dust after being collected by the dust filtering filter 336.

In an exemplary embodiment, the dust collecting container 340 is configured to be capable of being drawn out from the indoor side-surface of the main body 310, such that the user may draw out the dust collecting container 340 from indoors.

Although not described, the second air purifying unit 300, in the same manner as the first air purifying unit 200 as described above, includes the sensor (not described) for sensing the weight or stacked height of dust stored in the dust collecting container 340, and may have a function of notifying the user of the dust removing time stored in the dust collecting container 340.

The cleaning brush 350 is provided inside the dust collecting container 340 and may brush the surface of the dust filtering filter 336 by the rotation of the dust filtering filter 336.

In an exemplary embodiment, the cleaning brush 350 is provided so as to be in contact with the outer surface of the dust filtering filter 336 when the dust collecting container 340 is mounted on the main body 310, and may collect dust collected in the dust filtering filter 336 by brushing the surface of the dust filtering filter 336 by the rotation of the dust filtering filter 336.

At this time, the dust collected in the cleaning brush 350 may fall and be stored in the dust collecting container 340.

Such a cleaning brush 350 performs a function of automatically cleaning the dust filtering filter 336 when the second air purifying unit 300 is operated.

Finally, a ventilation device 100 according to another exemplary embodiment in the present disclosure will be described.

The ventilation device 100 according to another exemplary embodiment in the present disclosure may include the first air purifying unit 101 and the second air purifying unit 102.

The first air purifying unit 101 may intake outdoor air and discharge the air indoors.

The second air purifying unit 102 may intake contaminated indoor air and discharge the air outdoors.

Here, the first air purifying unit 101 and the second air purifying unit 102 may have a structure in which one side may be coupled to each other. In an exemplary embodiment, the housing 1260 of the second air purifying unit 102, as illustrated in FIG. 28, may include an upwardly protruding coupling unit, and a cavity to which the coupling unit is inserted and coupled may be downwardly formed. In addition, the second air purifying unit 102 may include a coupling sensing unit 210 capable of sensing a coupling with the first air purifying unit 101.

On the other hand, the second air purifying unit 102 may determine the rotating direction according to whether the second air purifying unit 102 is coupled to the first air purifying unit 101.

In an exemplary embodiment, when the first air purifying unit 101 and the second air purifying unit 102 is coupled to each other, the units may operate as ventilation devices for discharging the contaminated indoor air outdoor and introducing the outdoor air indoors. The first air purifying unit 101 and the second air purifying unit 102 coupled to operate as a ventilation device may be installed on one side of the window 1, as illustrated in FIGS. 1 to 3.

In this case, when an operation signal is input, the first air purifying unit 101 drives a fan motor 1112 of a first blowing fan 1110 to rotate a fan blade 1114, thereby discharging the outdoor air intaken through the rear surface of the first air purifying unit to indoors through a grill 1152 of the front surface.

In detail, a louver 1154 may be installed on the rear surface of the first air purifying unit 101, and when the operation signal is input, the louver 1154 is opened, and the outdoor air may be introduced indoors, by rotating the fan blade 1114.

In addition, the second air purifying unit 102 drives the fan motor 1222 to rotate the fan blade 1224 by the operation signal, and may discharge the indoor air intaken through the grill of the front surface of the second air purifying unit 102 through the rear surface outdoors.

A louver 1264 may be installed on the rear surface of the second air purifying unit 102, when the operation signal is input, the louver 1264 is firstly opened, and then the indoor air may be discharged outdoors, by rotating the fan blade 1224.

In another exemplary embodiment, when the first air purifying unit 101 and the second air purification unit 102 are separated from each other, the first air purifying unit 101 and the second air purifying unit 102 intake contaminated indoor air, respectively, and may operate as air purifying devices for intaking in the air and filtering contaminants included in the intaken air.

In this regard, the first air purifying unit 101 may operate to intake and discharge the air in the same direction (from the rear side to the front side) as the case in which the first air purifying unit 101 is separated from the second air purifying unit 102.

Alternatively, when the second air purifying unit 102 is coupled with the first air purifying unit 101, since the direction in which the air is intaken and discharged is formed in the direction opposite to the direction of the first air purifying unit 101, in a case in which the second air purifying unit is separated from the first air purifying unit 101, the rotating direction of the fan blade 1224 may be changed such that the air cleaning operation may be performed in the same direction as the first air purifying unit 101.

In detail, the second air purifying unit 102 may determine the rotating direction of the fan blade 1224 depending on whether the second air purifying unit 102 is coupled to the first air purifying unit 101 or not.

Specifically, when the second air purifying unit 102 detects the coupling with the first air purifying unit 101, the fan blade 1224 may be rotated in a forward direction (the direction in which the flow of air generated by the rotation of the fan blade is formed from the front surface to the rear surface) to intake the contaminated indoor air and discharge the air outdoors.

Contrarily, the second air purifying unit 102 may rotate the fan blade 1224 in the reverse direction to intake the contaminated indoor air through the rear surface and discharge the air from the front surface, filtering contaminants from the intaken air when the coupling with the first air purifying unit 101 is not detected.

Hereinafter, the configuration and operation of the first air purifying unit 101 and the second air purifying unit 102 for realizing such an operation will be described in more detail.

FIG. 27 is a view for explaining an exemplary embodiment of the first air purifying unit 101.

Referring to FIG. 27, the first air purifying unit 101 according to an exemplary embodiment in the present disclosure may include a first blowing fan 1110, a first filter unit 1120, a first filter sensing unit 1130, and a first controlling unit 1140.

In addition, the first air purifying unit 101 may further include a housing 1150 formed with a cavity capable of receiving a coupling portion of the second air purifying unit 102, a grill 1152 disposed on the front surface and through which air may pass, and a louver 1154 whose opening is determined by an operation signal.

The first blowing fan 110 may include at least one fan blade 1114 and a fan motor 1112 for driving the fan blade. The fan motor 1112 may be driven under the control of the first control unit 1140 and the fan blade 1114 may intake air from the rear side and discharge the air on the front side by forming the air flow by the driving speed of the fan motor 1112.

The first filter unit 1120 may include at least one filter of 1122 and 1124 which filters contaminants included in the air intaken by the first blowing fan 1110, in detail, the first filter unit 1120 may include at least one of a pre-filter and a HEPA filter in order to filter contaminants included in the intaken air.

The first filter sensing unit 1130 may sense whether the filters 1122 and 1124 are mounted. The first filter sensing unit 1130 may sense the mounting of the filters 1122 and 1124 and generate a mounting sensing signal, and may output the signal to the first controlling unit 1140.

The first controlling unit 1140 may control an overall operation of the first air purifying unit 101 based on an operation signal. The first controlling unit 1140 may control the opening and closing of the louver 1154 based on the operation signal, may rotate the fan blade 1114 by driving the fan motor 1112.

In an exemplary embodiment, the first controlling unit 1140 may adjust the rotational speed of the fan blade by adjusting the driving speed of the fan motor 1112. Here, the first controlling unit 1140 may adjust the rotational speed of the fan blade 1114 according to a degree of contamination, a user input signal, and the like.

In addition, the first controlling unit 1140 may adjust a driving speed of the motor depending on whether the filters 1122 and 1124 sensed by the first filter sensing unit are mounted. The reason is that the differential pressure varies depending on the number of filters 1122 and 1124 mounted in the first air purifying unit 101 and types of filter to be mounted.

The first controlling unit 1140 may increase the rotational speed when the mounting of the HEPA filter having a high differential pressure is sensed. Further, the first controlling unit 1140 may increase the rotational speed as the number of mounted filters increases.

In an exemplary embodiment, the first controlling unit 1140 may include at least one processing unit and memory. In this case, the processing unit, for example, may include a central processing unit (CPU), a graphics processing unit (GPU), a microprocessor, an application specific integrated circuit (ASIC), and the like and may have a plurality of cores. The memory may be a volatile memory, a non-volatile memory, and a combination thereof.

FIG. 28 is a view for explaining an exemplary embodiment of the second air purifier unit 102.

Referring to FIG. 28, a second air purifying unit 102 according to an exemplary embodiment in the present disclosure may include a coupling sensing unit 1210, a second blowing fan 1220, a second filter unit 1230, a second filter sensing unit 1240, and a second controlling unit 1250.

In addition, the second air purifying unit 102 may further include a housing 1260 formed with a coupling portion 1266 which may be coupled to a cavity of the first air purifying unit 101 on the upper side, a grill 1262 in which the air may be passed, and a louver 1264 which may be determined to be opened and closed according to an operation signal.

The coupling sensing unit 1210 may sense the coupling to the first air purifying unit 101. In an exemplary embodiment, the coupling sensing unit 1210 may be realized as a reed switch disposed in the coupling portion 1266 and sensing a physical contact with the first air purifying unit 101, or a magnetic sensor sensing a magnet attached to the cavity of the first air purifying unit 101, and may output to the second controlling unit 1250 by generating a coupling sensing signal.

The second blowing fan 1220 may include at least one fan blade 1224 and a fan motor for driving the same. The fan motor 122 may be driven under the control of the second controlling unit 1250. The rotating direction of the fan blade 1224 may be determined by the second controlling unit 1250 depending on whether the coupling to the first air purifying unit 101. By rotating in the determined rotating direction, the air on the front side may be intaken and discharged to the rear side, or the air on the rear side may be intaken and discharged to the front side.

The second filter unit 1230 may include at least one of filters 1232 and 1234 for filtering contaminants included in the air intaken by the second blowing fan 1220. Here, the second filter unit 1230 may include at least one of a pre-filter and a HEPA filter to filter contaminants included in the intaken air.

The second filter sensing unit 1240 may sense whether the filters 1232 and 1234 are mounted. The second filter sensing unit 1240 may sense the mounting of the filters 1232 and 1234 and generate the mounting sensing signal and output the sensing signal to the second controlling unit 1250.

The second controlling unit 1250 may control the overall operation of the second air purifying unit 102 depending on the operation signal. The second controlling unit 236 may adjust the opening and closing of the louver 1264 according to the operation signal and may determine the rotating direction of the fan blade 1224 depending on whether the first air purifying unit 101 is sensed toy the coupling sensing unit 1210, and accordingly rotate the fan blade by driving the fan motor 1222 in the rotating direction.

In an exemplary embodiment, the second controlling unit 1250 may adjust the rotational speed of the fan blade 1224 by adjusting the driving speed of the fan motor 1222. Here, the second controlling unit 1250 may adjust the rotational speed of the fan blade 1224 according to a degree of contamination of the air, a user input signal, or the like.

In addition, the second controlling unit 1250 may adjust the driving speed of the fan motor 1222 according to whether the filters 1232 and 1234 are mounted. The reason is that the differential pressure varies depending on the number of filters 1232 and 1234 mounted on the second air purifying unit 102 and types of filter to be mounted.

For example, the second controlling unit 1250 may increase the rotational speed when the mounting of the HEPA filter having a high differential pressure is detected. In addition, the second controlling unit 1250 may increase the rotational speed as the number of mounted filters increases.

For reference, when the second air purifying unit 102 is coupled to the first air purifying unit 101, and discharge the indoor air outdoors, installing a high-cost HEPA filter is not needed.

Alternatively, when the second air purifying unit 102 is separated from the first air purifying unit 101 and used as an air cleaning device, a HEPA filter is required to filter contaminants in the air. In this case, a differential pressure for driving the second air purifying unit 102 is increased or decreased depending on whether the HEPA filter is attached or not. In order to efficiently drive the second air purifying unit 102 depending on whether the filter is mounted or not, the rotational speed of the fan blade 1224 may be adjusted according to the mounted number of the fan blade 1224 or the mounted filter.

In an exemplary embodiment, the second controlling unit 1250 may include at least one processing unit and memory. In detail, the processing unit may include, for example, a central processing unit (CPU), a graphics processing unit (GPU), an application specific integrated circuit (ASIC), and a field programmable gate array (FPGA) and may have a plurality of cores. The memory may be a volatile memory, a non-volatile memory or a combination thereof.

While the present invention has been described with reference to exemplary embodiments in the present disclosure is not limited thereto, but various modifications may be made within the technical ideas of the present disclosure.

The invention claimed is:

1. An air purifying unit, comprising:
   a housing provided with an air intake unit on one side and an air discharge unit on the other side;
   a blowing fan provided inside of the housing;
   an air purifier installed between the air intake unit and the blowing fan to purify air;
   a fan guide provided inside of the housing, the fan guide configured to surround an outer periphery of the blowing fan;
   a pre-filter unit provided between the air intake unit and the air purifier, the pre-filter unit comprising a roll filter wound and rotating around a winding roller; and
   an inner brush configured to brush dust collected on an inner side surface of the roll filter, the inner brush inclined downwardly toward one end of the roll filter such that dust accumulated in the roll filter is brushed and then moved in a direction of the one end of the roll filter.

2. The air purifying unit according to claim 1, wherein the fan guide is configured to accommodate the air filter and receive the pre-filter unit to form an integral air flow path between the blowing fan, the air purifier, and the pre-filter unit.

3. The air purifying unit according to claim 2, wherein the fan guide is extended to an outer periphery of the pre-filter unit from the outer periphery of the blowing fan, to guide air having passed through the pre-filter unit and the air purifier, to the blowing fan.

4. The air purifying unit according to claim 3, wherein the fan guide is configured to integrally surround the outer periphery of the blowing fan, the outer periphery of the air purifier, and an outer periphery of the pre-filter unit.

5. The air purifying unit according to claim 4, wherein the fan guide comprises a fan casing unit in which the blowing fan is disposed inside, a purifying filter casing unit in which the air purifier is disposed inside, and a pre-filter casing unit in which the pre-filter unit is disposed inside.

6. The air purifying unit according to claim 2, wherein the winding roller comprises an upper winding roller and a lower winding roller provided below the upper winding roller, the roll filter wound and rotating around the upper winding roller and the lower winding roller.

7. The air purifying unit according to claim 1, wherein the roll filter rotates in such a manner that a surface of the roll filter contacting the inner brush moves downwardly.

8. The air purifying unit according to claim 7, wherein the inner brush is extended to both ends of the roll filter.

9. The air purifying unit according to claim 1, further comprising a dust tray provided below the roll filter, the dust tray capable of being drawn out to the outside of the housing and storing dust falling from one end of the inner brush.

10. The air purifying unit according to claim 1, wherein the inner brush comprises a brush bristle inclined in a direction of one end of the roll filter in a brush body.

11. The air purifying unit according to claim 9, wherein the inner brush is disposed in such a manner that one end is disposed adjacent to an upper end of the lower winding roller.

12. The air purifying unit according to claim 7, wherein the lower winding roller is provided with a support frame that is rotatably coupled to a rotary shaft of the lower winding roller and supports the inner brush.

13. The air purifying unit according to claim 12, wherein the support frame transmits a part of rotational force of the rotary shaft of the lower winding roller to the inner brush through frictional force of the rotary shaft of the lower winding roller to press the inner brush against the inner side-surface of the roll filter.

14. The air purifying unit according to claim 13, wherein the support frame is rotatably coupled to the rotary shaft of the lower winding roller with predetermined rotational frictional force.

15. The air purifying unit according to claim 1, wherein the housing has the air intake unit on an outdoor side surface and the air discharge unit on an indoor side surface, the air purifier comprises an air purifying filter being provided inside the housing and drawn out to a lower end or side surface of the housing and capable of being obliquely drawn out in a direction of the indoor side surface of the housing.

16. The air purifying unit according to claim 15, wherein the air purifying filter is obliquely mounted inside the housing in such a manner that the lower end of the air purifying filter is disposed adjacent to the indoor side surface than the upper end of the air purifying unit.

17. An air cleaning/ventilation device comprising:
   a plurality of air purifying units of claim 1,
   wherein each of the plurality of the air purifying units independently performs an air purifying operation.

18. The air cleaning/ventilation device according to claim 17, wherein a first air purifying unit and a second air purifying unit are installed in a window and are configured to intake air on one side and discharge the purified air to the other side.

* * * * *